US006665722B1

(12) United States Patent
Elliott

(10) Patent No.: US 6,665,722 B1
(45) Date of Patent: Dec. 16, 2003

(54) STORE-AND-FORWARD PACKET RADIO SYSTEM AND METHOD

(75) Inventor: Brig Barnum Elliott, Arlington, MA (US)

(73) Assignee: BBNT Solutions LLC, Cambridge, MA (US)

( * ) Notice: Subject to any disclaimer, the term of this patent is extended or adjusted under 35 U.S.C. 154(b) by 784 days.

(21) Appl. No.: 09/583,352

(22) Filed: May 31, 2000

(51) Int. Cl.[7] .......................... G06F 15/16; H04L 12/28
(52) U.S. Cl. ...................... 709/227; 709/245; 370/389; 370/392; 370/432; 370/471
(58) Field of Search ................................. 709/227, 245; 370/389, 392, 432, 471

(56) References Cited

U.S. PATENT DOCUMENTS

| 5,509,000 A | * | 4/1996 | Oberlander ................. 370/409 |
| 5,970,059 A | * | 10/1999 | Ahopelto et al. ........... 370/338 |
| 5,978,386 A | * | 11/1999 | Hamalainen et al. ....... 370/466 |
| 5,983,090 A | * | 11/1999 | Aoki ........................... 455/403 |
| 6,018,522 A | | 1/2000 | Schultz ........................ 370/431 |
| 6,034,970 A | * | 3/2000 | Levac et al. ................. 370/466 |
| 6,040,783 A | | 3/2000 | Houvener et al. ..... 340/825.31 |
| 6,047,194 A | | 4/2000 | Andersson ................... 455/466 |
| 6,230,012 B1 | * | 5/2001 | Willkie et al. ........... 455/435.1 |

* cited by examiner

*Primary Examiner*—Krisna Lim
(74) *Attorney, Agent, or Firm*—Leonard Charles Suchyta; James K. Weixel

(57) ABSTRACT

A communication device sends a message to one or more recipients in a communications network. The communication device retrieves device identifiers from a list of device identifiers stored in a memory of the device. The device identifiers include audio, pictorial and/or video data. The communication device presents the audio, pictorial and/or video data to a user of the device in auditory or visual form (1310) and then receives user input in response to the presented data (1325). The communication device designates a second communication device as a destination for the message based on the user input (1330). The communication device then sends the message to the second communication device.

48 Claims, 17 Drawing Sheets

RE-INITIALIZATION

STORE-AND-FORWARD PACKET RADIO SYSTEM AND METHOD

FIELD OF THE INVENTION

The present invention relates generally to packet radio networks and, more particularly, to systems and methods for providing improved user-friendly packet delivery techniques in mobile packet radio networks.

BACKGROUND OF THE INVENTION

Wireless data communication is often required in an environment where communications infrastructure, such as base stations or a wired backbone network, does not exist or is uneconomical or impractical to use. For example, in military or emergency environments, adequate infrastructure often does not exist in necessary locations and constructing such an infrastructure would be either impractical or uneconomical for the short-term use that is often required. Mobile wireless networks, which permit communication between wireless devices in the network over an air interface link without routing packets through any portion of a conventional cellular network, such as the wired backbone network, base station controllers, or base stations, have therefore been developed to provide wireless data communications in such environments.

Point-to-point communication in a mobile wireless network suffers from a number of disadvantages. One disadvantage is the limited transmission range associated with each wireless device in the network. Each wireless device in the network is limited in the distance over which it can reliably transmit, with transmission ranges of between a few feet and hundreds of feet being typical. Therefore, it is often the case that a source wireless device is out of transmission range with a destination wireless device with which the source device desires to communicate. The source wireless device user, therefore, has to wait until the destination wireless device comes within transmission range before attempting to communicate, or re-transmit the data at a later time when no acknowledgment is received from the destination device indicating that the device received the data from the source device.

FIG. 1 is a diagram of a two-node network illustrating this problem. The illustrative network includes a source device 115 and a destination device 120. As shown, each device (115, 120) has an effective transmission range delineated by dotted lines 105 and 110, respectively. Since the transmission range of source device 115 (dotted line 105) does not encompass destination device 120, device 115 cannot communicate with node 120. Device 115 must, therefore, move in closer proximity to device 120 to be able to transmit data to device 120. FIG. 2 illustrates the situation where source device 115 and destination device 120 have moved within transmission range of one another. As shown, each device's (115, 120) effective transmission range (delineated by dotted lines 105 and 110, respectively) encompasses the other device. Devices 115 and 120, therefore, can communicate with each other.

An additional disadvantage with point-to-point communication in a mobile wireless network is that a source device may be unable to communicate with a destination device for a given period of time because the destination wireless device is either turned off or in an off-line status. In this case, the user of the source device must wait until the destination wireless returns to an on-line state, or turns on, before attempting once again to transmit data.

Therefore, there exists a need for a system and method that enables data communication between devices in a mobile wireless network, where the user of a sending device need only indicate data that is to be transmitted and the destination node to which the data is to be transmitted, and the sending device automatically attempts transmission of the data to the destination device, including re-transmission attempts if the destination device is out of transmission range, turned off, or off-line.

SUMMARY OF THE INVENTION

Systems and methods consistent with the present invention address this need by providing a wireless device that may store, and then forward, messages to destination devices when the destination devices come within transmission range of the wireless device.

In accordance with the purpose of the invention as embodied and broadly described herein, a method for introducing a first communication device to a second communication device in a communication network includes transmitting a message from the first communication device. The message includes presentation data that further includes at least one of audio, pictorial and video data representing an identity of the first communication device. The second communication device receives the message and extracts the presentation data from the message. The second communication device presents the presentation data to a user of the second communication device in auditory or visual form and receives user input in response to the presentation. The second communication device then stores the presentation data in memory in the second communication device based on the user input.

In another implementation consistent with the present invention, a method of providing an identifier for a communication device includes inputting at least one of auditory, pictorial and video information into the communication device and converting the auditory, pictorial and video information into device identifier data. The method further includes storing the device identifier data in a memory of said communication device.

In a further implementation consistent with the present invention, a method of sending a message to one or more recipients in a communications network includes retrieving device identifiers from a list of device identifiers stored in a memory of a first communication device. The device identifiers include at least one of audio, pictorial and video data. The method further includes presenting the audio, pictorial and video data to a user of the first communication device in auditory or visual form and receiving user input in response to said presentation. The method additionally includes designating a second communication device as a destination for the message based on said user input and sending the message to the second communication device.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention improve the delivery of messages in wireless networks by permitting the temporary storage of messages in a sending device followed by the transmission or re-transmission of the messages when the destination devices come within the transmission range of the sending device.

EXEMPLARY DEVICE

Figure 1:
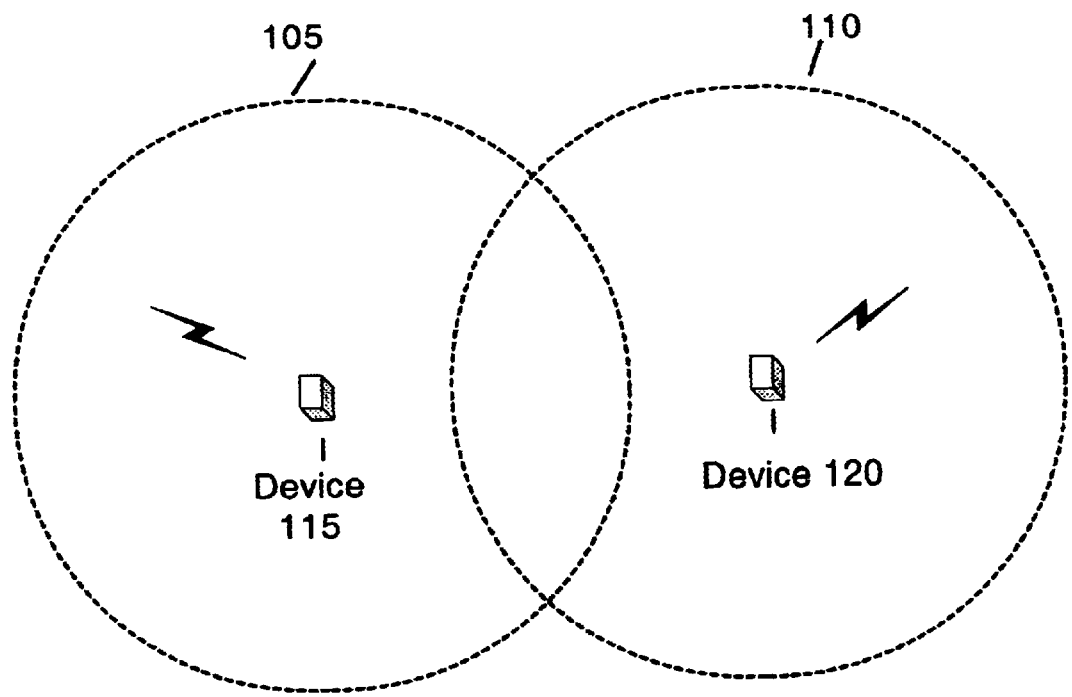
FIG. 1 illustrates an exemplary network in which two wireless devices are located outside of one another's transmission ranges.
Figure 2:
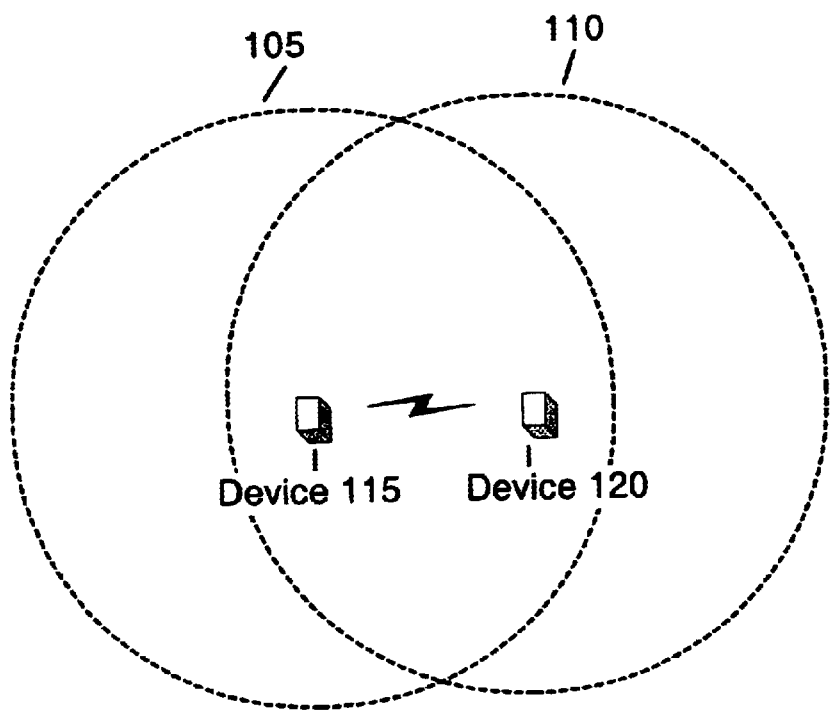
FIG. 2 illustrates an exemplary network in which two wireless devices have relocated within one another's transmission ranges.
Figure 3:
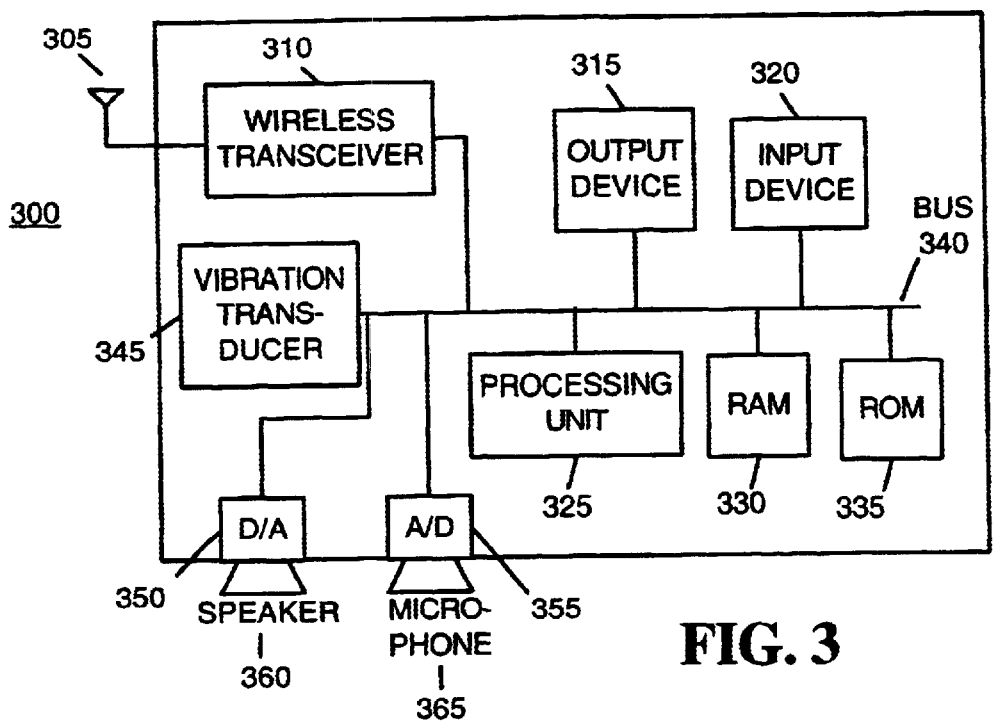
FIG. 3 illustrates an exemplary wireless device consistent with the present invention.

FIG. 3 illustrates an exemplary wireless data communications device 300 in which a system and method, consistent with the present invention, for storing and forwarding messages can be implemented. Exemplary wireless device 300 may comprise a cellular phone, a personal or portable computer, a personal digital assistant (PDA) or the like. Wireless device 300 includes an antenna 305, a wireless transceiver 310, an output device 315, an input device 320, a processing unit 325, a Random Access Memory (RAM) 330, a Read Only Memory (ROM) 335, a bus 340, a vibration transducer 345, a digital-to-analog (D/A) converter 350, an analog-to-digital (A/D) converter 355, a speaker 360 and a microphone 365.

Antenna 305 may include a conventional antenna that facilitates reception and transmission of data packets by wireless transceiver 310. Wireless transceiver 310 may include transceiver circuitry well known to one skilled in the art that can be tuned to multiple channels reserved for transmitting data in a wireless network (i.e., a channel can be a frequency, code, or time division of a physical radio frequency).

Input device 320 permits entry of data into wireless device 300 and includes a user interface (not shown). Output device 315 permits the output of data in video, audio, or hard copy format. Processing unit 325 performs all data processing functions for inputting, outputting, and processing of data. RAM 330 provides semi-permanent working storage of data and instructions for use by processing unit 325. ROM 335 provides permanent or semipermanent storage of data and instructions for use by processing unit 325. RAM 330 and ROM 335 may include large-capacity storage devices, such as a magnetic and/or optical recording medium and its corresponding drive. Bus 340 interconnects the various components of the device 300 to permit the components to communicate with one another.

Vibration transducer 345 includes a conventional mechanism for vibrating device 300 in response to command signals from processing unit 325. Digital-to-analog (D/A) converter 350 includes conventional circuitry for converting digital audio signals from digital to analog signal form. Analog-to-digital (A/D) converter 355 includes conventional circuitry for converting analog audio input signals from microphone 365 to digital signal form. Speaker 360 includes a conventional mechanism for providing an auditory output of the D/A converted audio signals. Microphone 365 includes a conventional mechanism for converting auditory input into analog signals.

EXEMPLARY DATABASE

Figure 4:
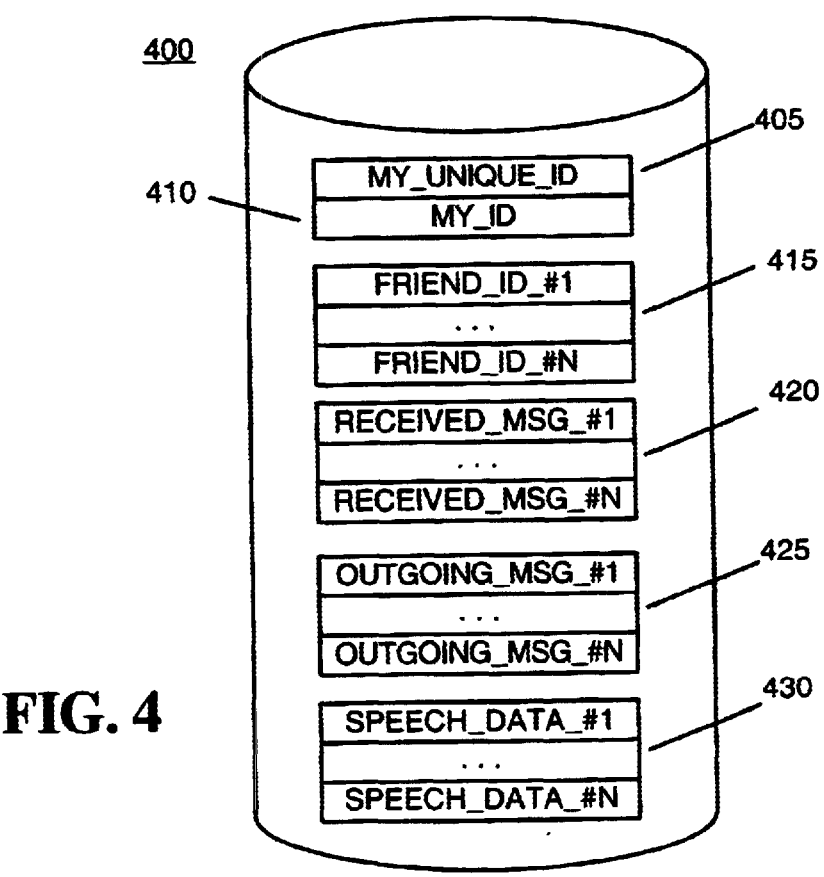
FIG. 4 illustrates an exemplary database consistent with the present invention.

FIG. 4 illustrates an exemplary database 400, consistent with the present invention, that may be stored within RAM 330 of device 300. Database 400 may include device identifiers MY_UNIQUE_ID 405 and MY_ID 410 for device 300, a list of device identifiers 415 for wireless devices other than device 300 consisting of FRIEND_ID_#1 through FRIEND_ID_#N, a list of messages 420 received by device 300 consisting of RECEIVED_MSG_#1 through RECEIVED_MSG$_{13}$ #N, a list of outgoing messages 425 that are queued for transmission in RAM 330 of device 300 consisting of OUTGOING_MSG_#1 through OUTGOING_MSG_#N, and a list 430 of speech data SPEECH_DATA_#1 through SPEECH_DATA_#N.

Device identifier MY_UNIQUE_ID 405 may include a global identifier that uniquely identifies device 300 and may consist of a unique series of bytes that are machine-readable. Audio identifier MY_ID 410 may include a recorded audio message that provides a human-understandable auditory identification for device 300. Each data block from list 430 may include speech messages SPEECH_DATA_#1 through SPEECH_DATA_#N that are associated with the operation of device 300. For example, when a message is received from another device, device 300 may play selected speech data from database 400, containing an auditory message "A message has been received," to a user of the device 300.

Figure 5:
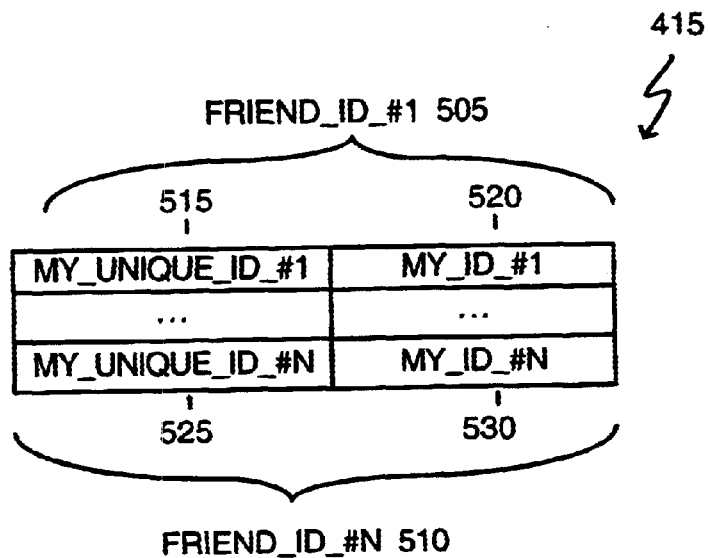
FIG. 5 illustrates a list of exemplary device identifiers consistent with the present invention.

FIG. 5 further illustrates list 415 which may include device identifiers for other devices with which device 300 communicates. List 415 consists of device identifiers FRIEND_ID_#1 505 through FRIEND_ID_#N 510. Each device identifier FRIEND_ID_#1 505 through FRIEND_ID_#N 510 may include unique global identifiers MY_UNIQUE_ID_#1 515 through MY_UNIQUE_ID_#N 525 and audio identifiers MY_ID_#1 520 through MY_ID_#N 530, respectively. Global identifiers MY_UNIQUE_ID_#1 515 through MY_UNIQUE_ID_#N 525 identify devices other than device 300. Audio identifiers MY_ID_#1 through MY_ID_#N comprise recorded audio messages that can provide human-understandable auditory identifications for the devices identified by the global identifiers.

Figure 6:
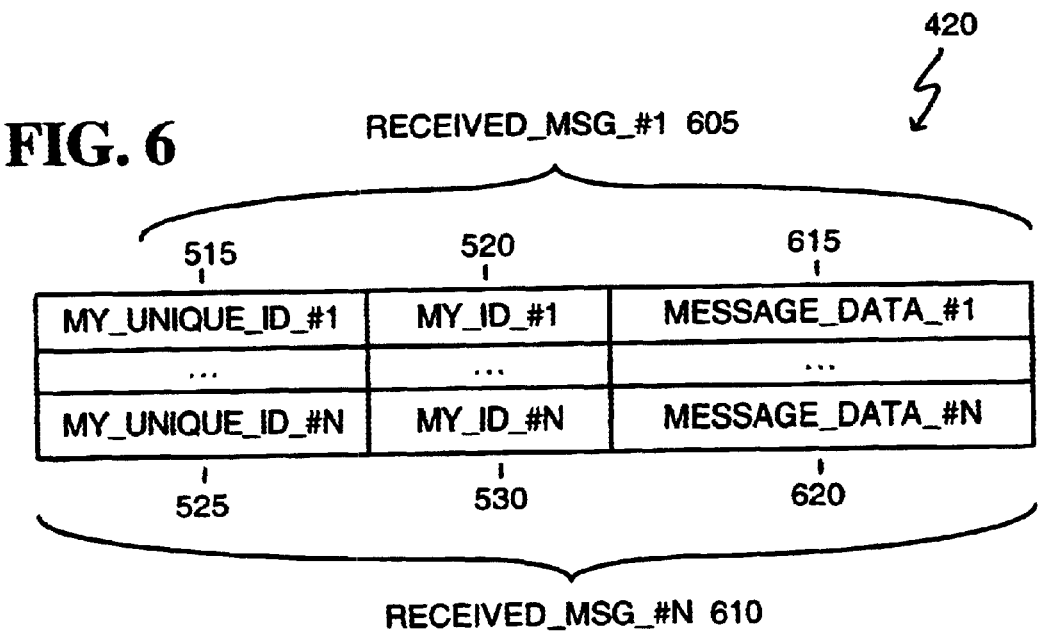
FIG. 6 illustrates a list of exemplary messages received at a wireless device consistent with the present invention.

FIG. 6 illustrates received message list 420 includes messages that have been received from other devices at device 300 and stored in RAM 330. Each individual message, RECEIVED_MSG_#1 605 through RECEIVED_MSG_#N 610 may consist of unique global identifiers MY_UNIQUE_ID_#1 515 through MY_UNIQUE_ID_#N 525 (described above), audio identifiers MY_ID_#1 520 through MY_ID_#N 530 (described above), and message data MESSAGE_DATA_#1 615 through MESSAGE_DATA_#N 620, respectively. Each message MESSAGE_DATA_#1 615 through MESSAGE_DATA_#N 620, may consist of audio, video, or pictorial data which includes the message from a device other than device 300.

Figure 7:
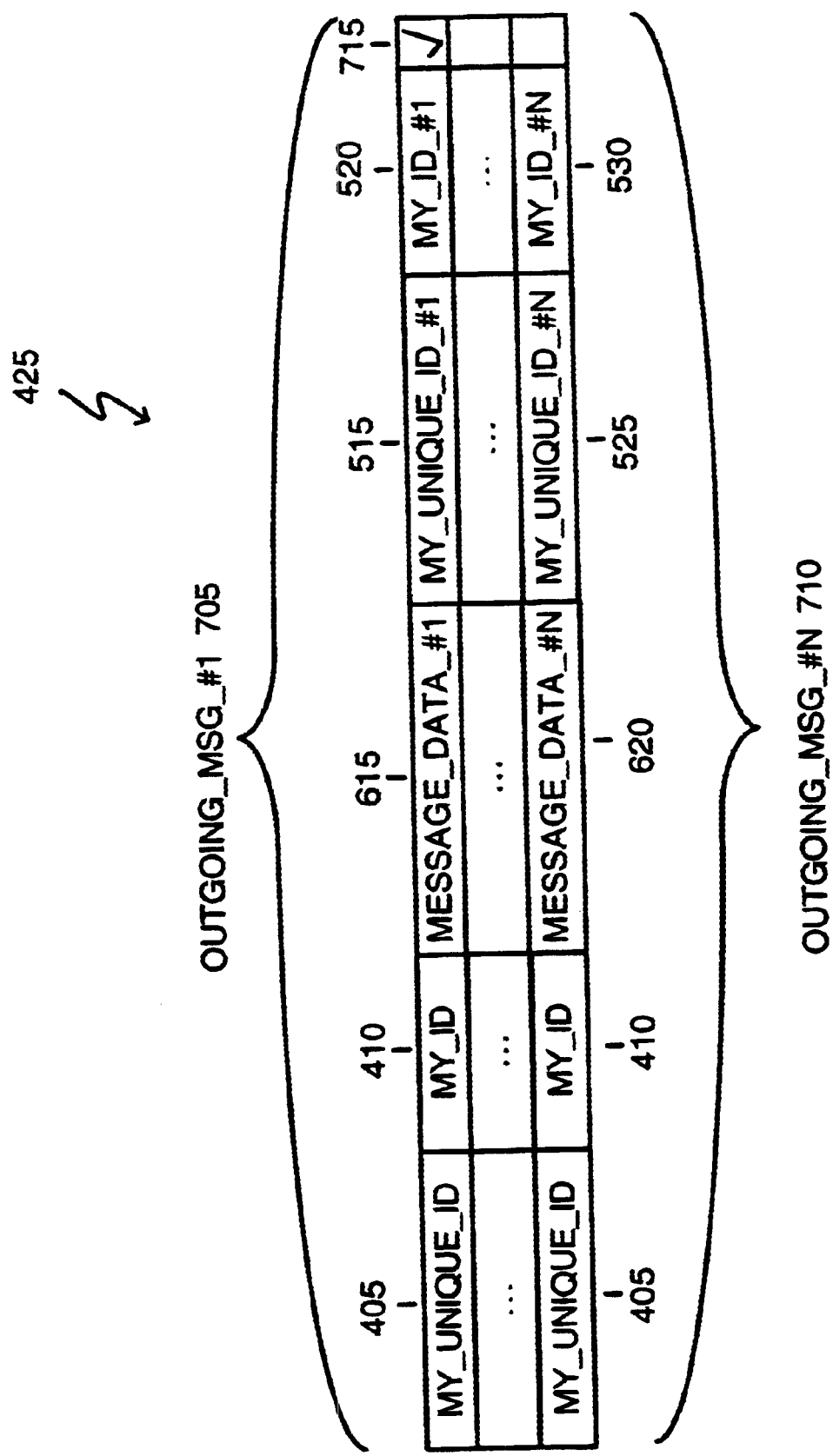
FIG. 7 illustrates a list of exemplary outgoing messages that are to be transmitted from a wireless device consistent with the present invention.

FIG. 7 illustrates outgoing message list 425 that include messages that are waiting in queue in RAM 330 for transmission to a selected destination device(s). Each individual message, OUTGOING_MSG_#1 705 through OUTGOING_MSG_#N 710, may consist of the global device identifier MY_UNIQUE_ID 405 and audio identifier MY_ID 410 of device 300, indicating device 300 as the message source. Each individual message from list 425 additionally may consist of unique global identifiers MY_UNIQUE_ID_#1 515 through MY_UNIQUE_ID_#N 525 (described above) and audio identifiers MY_ID_#1 520 through MY_ID_#N 530 (described above) indicating the devices to which each message is to be sent. Each individual message from list 425 further may further consist of audio, video, or pictorial message data MESSAGE_DATA_#1 615 through MESSAGE_DATA_#N 620 (described above) for each respective device to which device 300 is sending data. Furthermore, each outgoing message has a field 715 stored in database 400 that identifies when a message has been successfully delivered to an appropriate device.

EXEMPLARY USER INTERFACES

Figure 8:
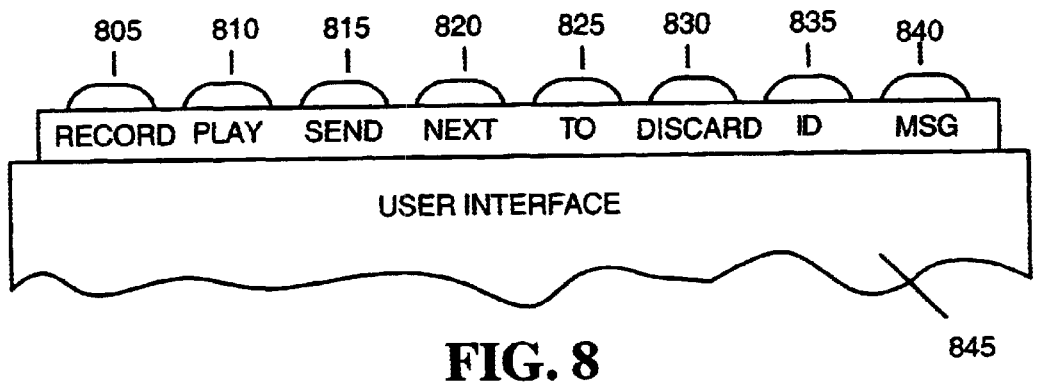
FIG. 8 illustrates a first exemplary user interface consistent with the present invention.

FIG. 8 illustrates a first exemplary user interface 800 for input device 320 of device 300. User interface 800 may consist of a number of buttons disposed on the exterior package 845 of device 300 that can be selected for control of the operation of the device. These buttons include a RECORD button 805, a PLAY button 810, a SEND button 815, a NEXT button 820, a TO button 825, a DISCARD button 830, an ID button 835, and a MSG button 840.

RECORD button 805 initiates an audio recording function in which auditory input to microphone 365 is A/D converted and stored in RAM 335. Selection of the PLAY button 810 initiates a playback function whereby audio data stored in RAM 335 is retrieved, D/A converted, and output through speaker 360. SEND 815 button, when selected, indicates that a designated message is to be transmitted to a particular destination wireless device. The NEXT button 820, when selected, indicates that the user wishes to proceed to a next message or identifier in a list of messages or identifiers. Selection of the TO button 825 indicates the selection of an identifier (FRIEND_ID) in device identifier list 415. DISCARD button 830, when selected, discards a received message (RECEIVED_MSG) in list 420 or a FRIEND_ID in the device identifier list 415. Selection of the ID button 835 indicates that subsequent user input to device 300 refers to received message list 420 or a device identifier list 415. MSG button 840, when depressed, indicates that subsequent user input to device 300 refers to outgoing message list 425.

Figure 9:
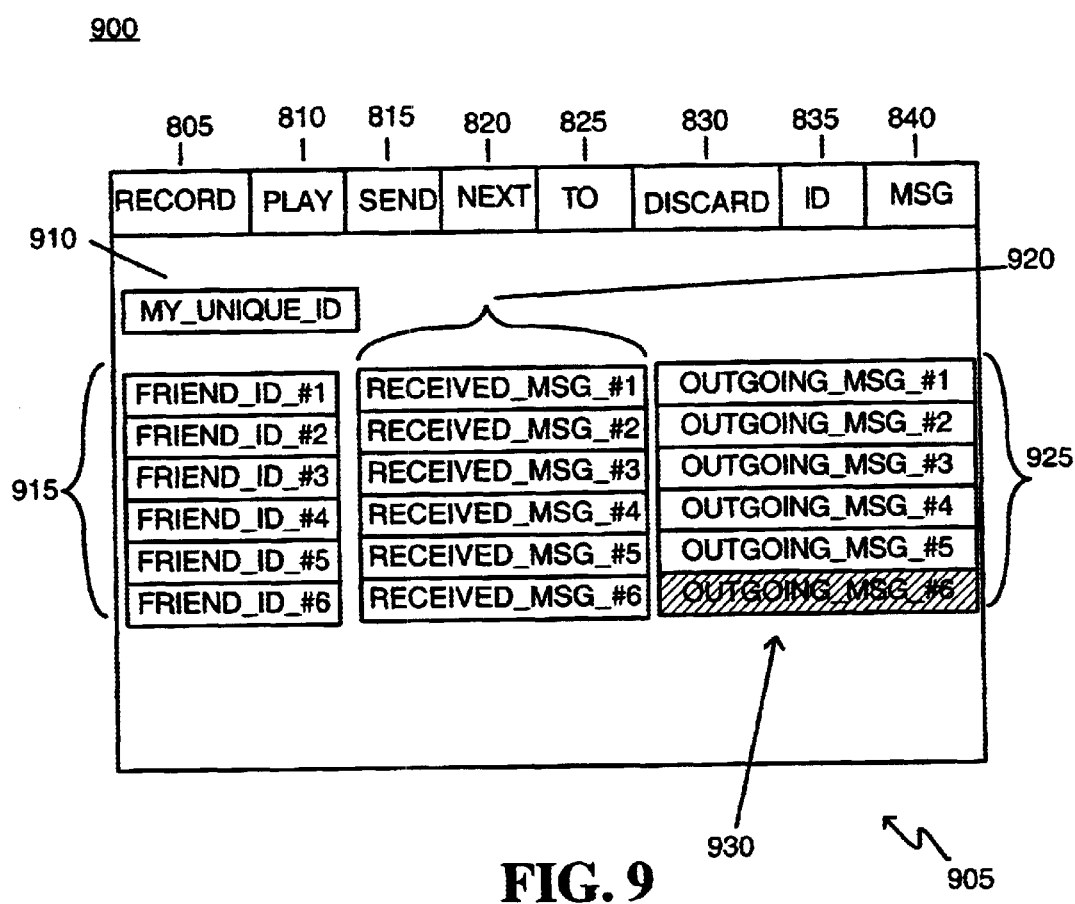
FIG. 9 illustrates a second exemplary user interface consistent with the present invention.

FIG. 9 illustrates a second exemplary user interface 900 of input device 320 in which input device 320 and output device 315 may both reside within a video display 905. Interface 900 includes a graphical user interface displayed upon video display 905 and includes graphical display "buttons" (shown as 805–840) for selecting the various functions described above with respect to FIG. 8. The graphical display "buttons" can be selected using a movable cursor, a touch sensitive display screen or the like. Additionally, user interface 900 contains data field displays (910, 915, 920, 925) that can be scrolled through, using a specified "button," to show the complete contents of data contained in lists 415, 420, 425, and 430. The graphical display buttons can also be used to select (highlight 930) a data item.

EXEMPLARY PROCESSING FOR INITIALIZATION

Figure 10:
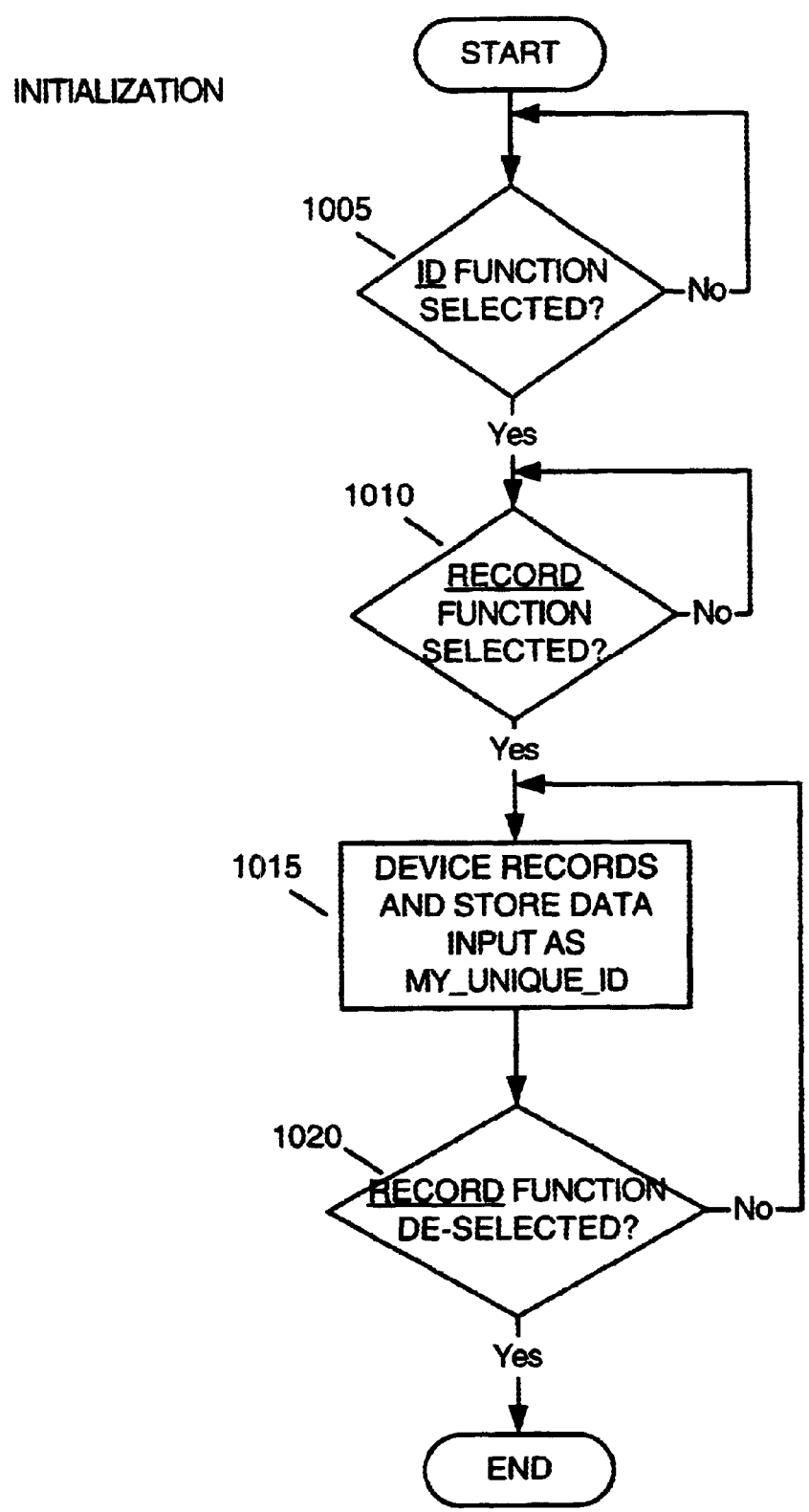
FIG. 10 illustrates an exemplary flow diagram of device initialization processing consistent with the present invention.

FIG. 10 is a flowchart of system processing, consistent with the present invention, for initializing device 300. For purposes of providing a specific example in the following flow charts, assume that "Sally" operates a sending device and "Jim" operates a destination device, with both sending and destination devices being substantially similar to device 300.

Initialization consists of device processing for permitting a user of device 300 to enter an auditory word or phrase that can be used as the user device's audio identifier MY_ID 410 when communicating with other devices. Device 300 first determines if the ID button 830 has been selected [step 1005]. If the ID button has been selected, device 300 next determines if the RECORD button 805 has also been selected [step 1010]. If the RECORD button 805 has been selected, then auditory input received at microphone 365 is analog-to-digital converted by A/D converter 355 and transferred, via processing unit 325, to RAM 330 for storage as MY_ID 410 [step 1015]. RECORD button 805 can be de-selected to end the recording process [step 1020].

Thus, if Sally or Jim desire to initialize their devices, each selects the ID function on their device and then selects the RECORD function. Sally and Jim then speak identifier phrases, such as "Sally" or "Jim" into microphone 365. After speaking these phases, Sally and Jim de-select the RECORD function on their respective devices. Each of Sally and Jim's wireless devices respectively store audio identifiers MY_ID 410 in memory.

EXEMPLARY PROCESSING FOR INTRODUCTIONS

Figure 11:
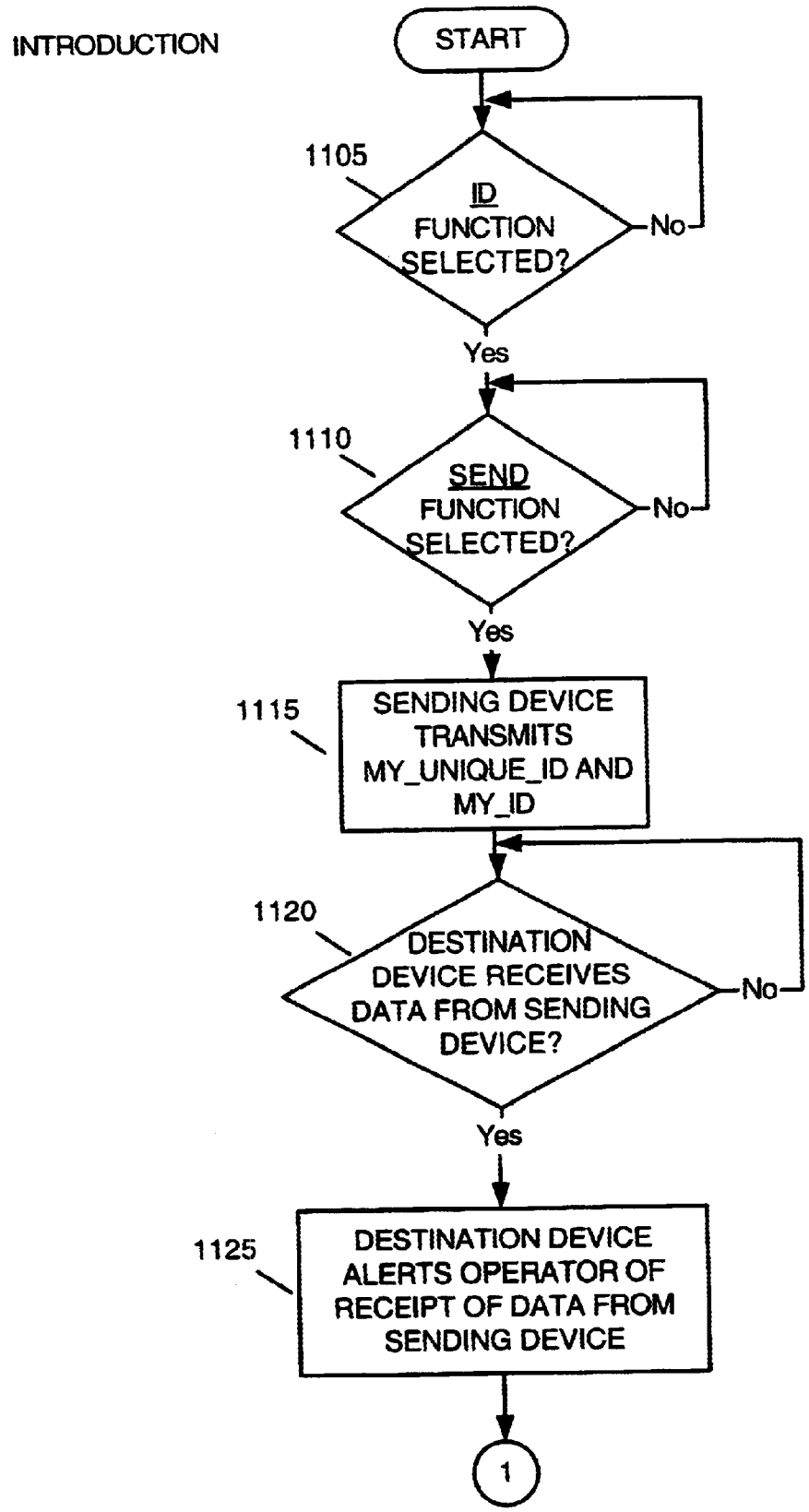
FIGS. 11–12 illustrate exemplary flow diagrams of device introduction processing consistent with the present invention.
Figure 12:
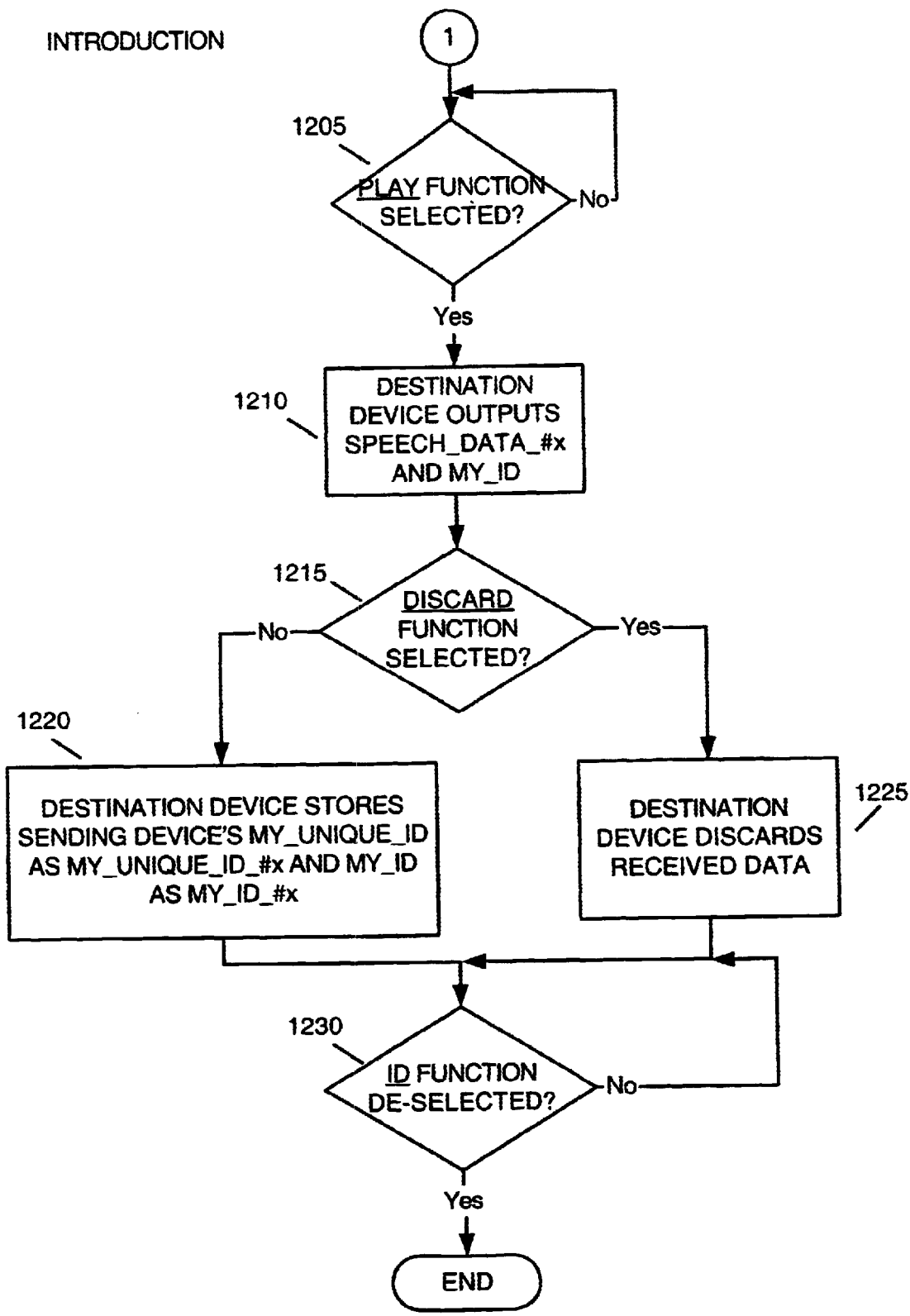

FIGS. 11–12 are flowcharts of system processing, consistent with the present invention, in which two wireless devices, such as Sally's and Jim's devices, are "introduced" to one another using a two-way "handshake" protocol. Before initiation of the "handshake" protocol, the two wireless devices must first be brought within transmission range of one another. Once the devices are within transmission range, a sending device determines if the device's ID button 835 has been selected [step 1105] (FIG. 11). If the ID function 835 has been selected, the sending device next determines if the SEND button 815 has also been selected [step 1110]. Sally may, thus, initiate the introduction of her device with Jim's device by selecting the ID function 835 and SEND function 815.

Once the SEND button 815 has been selected, the sending device transmits its MY_UNIQUE_ID 405, MY_ID 410 (e.g., auditory phrase "Sally"), and an indication that the transmission is an identification message [step 1115]. When the destination device receives the identification message from the sending device [step 1120], the destination device alerts the user of the destination device of the receipt of the message [step 1125]. This alert can include an audible message, such as a chime or bell sound, and/or a vibration of the device using vibration transducer 345.

After alerting the user, the destination device determines if the PLAY button 810 has been selected [step 1205] (FIG. 12). If so, the destination device retrieves speech data SPEECH_DATA_#x from database 400 and outputs the speech data, and then the sending device's audio identifier MY_ID 410, to A/D converter 350 and speaker 360 [step 1210]. SPEECH_DATA_#x may consist of an auditory phrase such as "Making friends with . . . ". In accordance with steps 1205–1210, Jim may thus select the PLAY function 810 in response to an alert message from his device and hear the auditory messages "Making friends with . . . " and "Sally" corresponding to SPEECH_DATA_#x and the sending device's MY_ID 410.

After listening to the sending device's MY_ID 410 (e.g., phrase "Sally"), the user of the destination device then may determine whether or not to accept the sending device as a "friend." If the user selects the DISCARD button 835 [step 1215], then the destination device removes from RAM 330 the MY_UNIQUE_ID 405 and MY_ID 410 data received from the sending device [step 1225]. If, however, the DISCARD button 835 is not selected, the sending device's MY_UNIQUE_ID 405 and MY_ID 410 are stored in list 415 of the destination device's ROM 335 as MY_UNIQUE_ID_#x and MY_ID_#x, respectively [step 1220]. Therefore, after hearing the phrases "Making friends with . . . " and "Sally," Jim may accept Sally as a friend by neglecting to select the DISCARD function 835.

To complete the "introduction" process, the destination device also performs steps 1105 (FIG. 11) through 1230 (FIG. 12) either simultaneously with, or after, the sending device. After completion of these steps by both devices, the sending and destination devices complete the "introduction" process when the ID button 835 is de-selected at both devices [step 1230]. Sally and Jim may, thus, complete the "introduction" process by de-selecting the ID buttons 835. Both Sally's device and Jim's device now retain the MY_UNIQUE_ID 405 and MY_ID 410 of each other's devices in memory.

EXEMPLARY PROCESSING FOR RECORDING A MESSAGE

Figure 13:
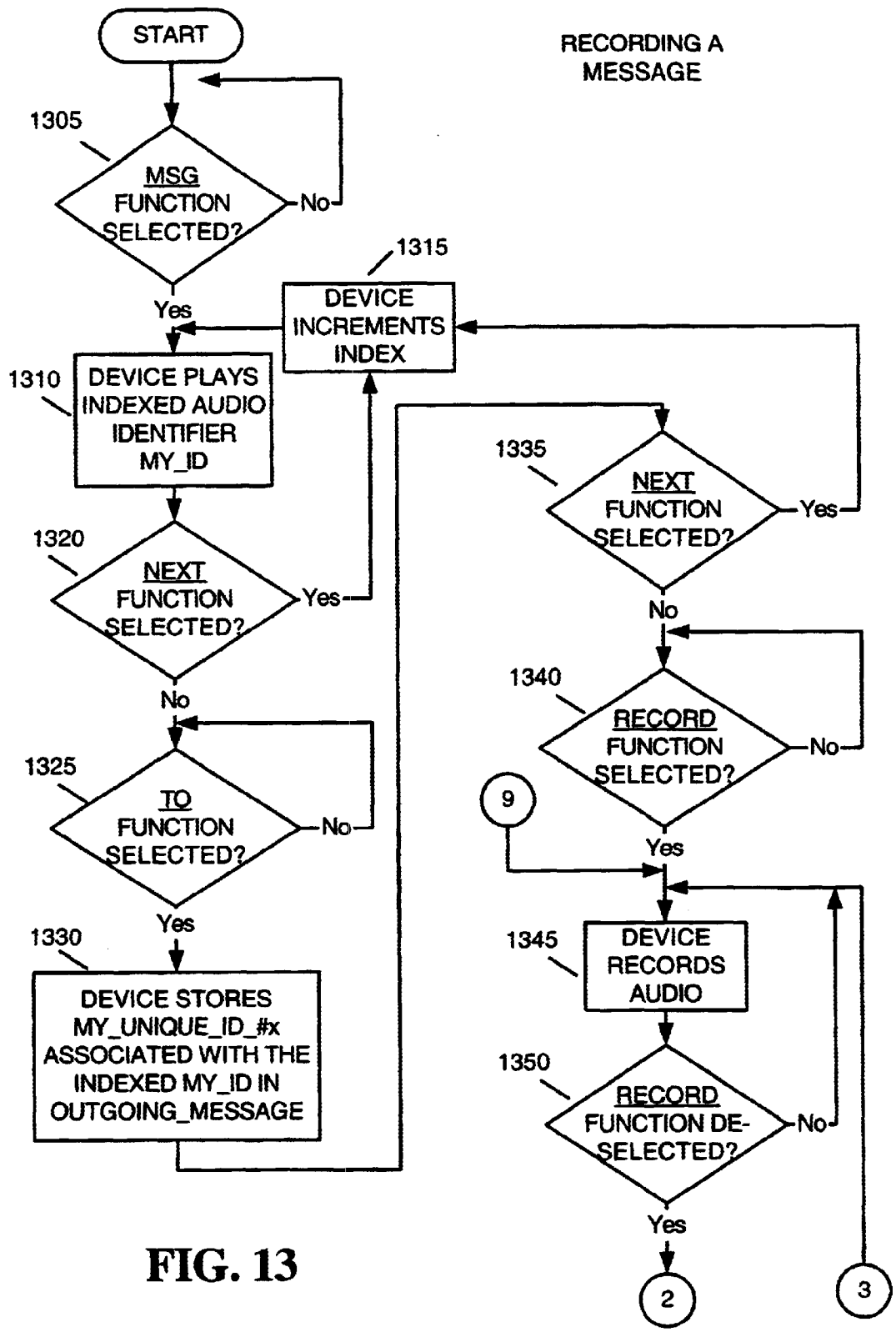
FIGS. 13–14 illustrate exemplary flow diagrams of device processing for recording a message consistent with the present invention.
Figure 14:
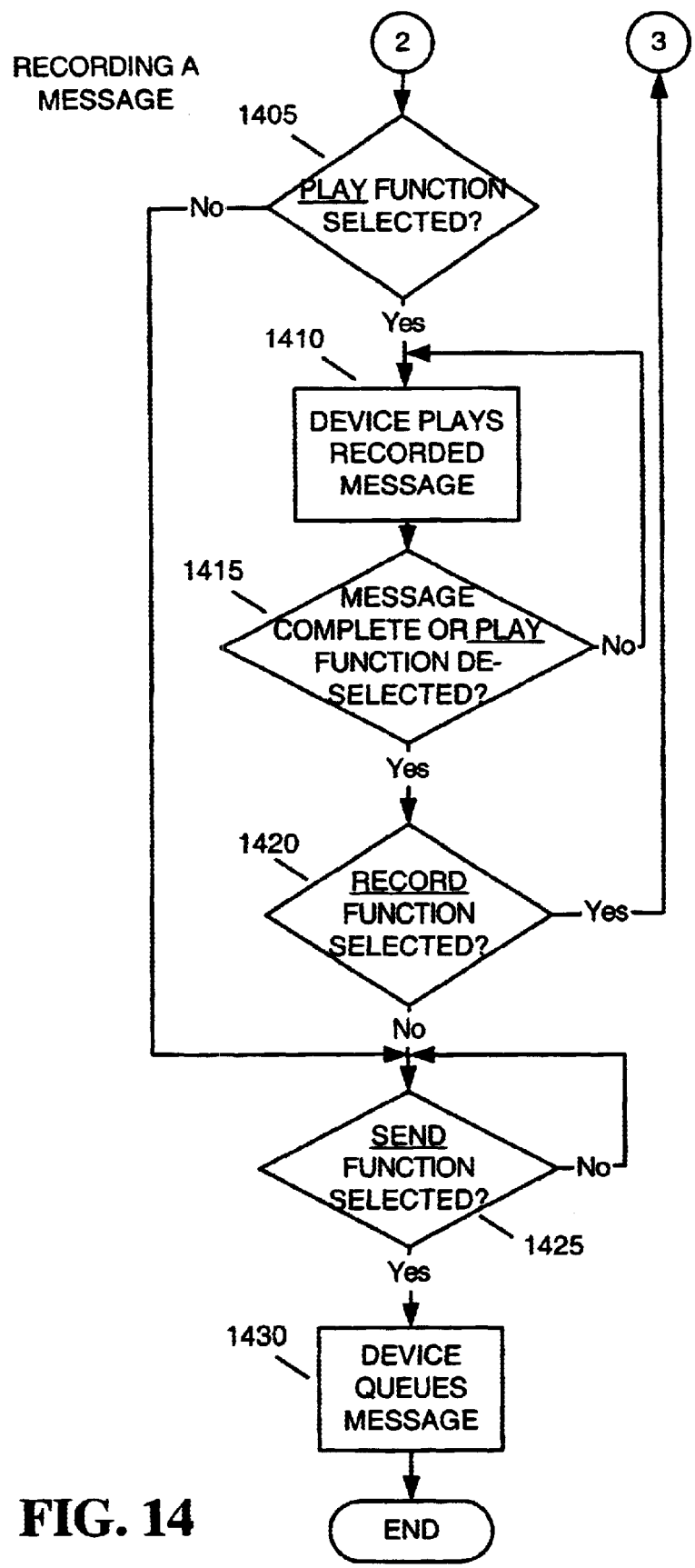

FIGS. 13–14 are flowcharts of system processing, consistent with the present invention, in which wireless device 300 records a message. For purposes of providing a specific example, assume that Sally wishes to send a message to Jim, with whom she has previously introduced herself (described above) and that Jim's audio identifier MY_ID is the first identifier stored in list 415 (e.g., MY_ID_#1).

To record a message, device 300 first determines if the MSG function 840 has been selected [step 1305] (FIG. 13). Sally desires to send a message to Jim, therefore, she selects the MSG function 840. Device 300 then retrieves the currently indexed (e.g., index=x) audio identifier (MY_ID_#x) from list 415 and outputs the identifier to D/A converter 350 and speaker 360 [step 1310]. Sally's device retrieves Jim's identifier MY_ID_#1 from list 415 and plays the identifier. Sally hears the phrase "Jim."

Device 300 then determines if the NEXT function has been selected [step 1320]. If so, device 300 increments index x (i.e., x=x+1) [step 1315] and returns to step 1310. In the case of Jim and Sally, Jim is the first identifier in list 415 and Sally, therefore, does not need to select the NEXT function 820. If the NEXT function 820 has not been selected, then device 300 determines if the TO function 825 has been selected [step 1325]. If so, device 300 stores the currently indexed MY_UNIQUE_ID_#x in an outgoing message [step 1330]. Since Sally wishes to send a message to Jim, whose identifier MY_ID_#1 is currently indexed, Sally selects the TO function 825.

Device 300 then determines if the NEXT function 820 has again been selected [step 1335]. If so, device 300 increments index x (i.e., x=x+1) and returns to step 1310 to permit the user to send a message concurrently to two or more devices. In the example, Sally wishes to send a message only to Jim, therefore, Sally does not select the NEXT function 820. If the NEXT function is not selected, device 300 determines if the RECORD function 805 has been selected [step 1340]. If so, auditory input received at microphone 365 is analog-to-digital converted by A/D converter 355 and transferred, via processing unit 325, to RAM 330 for storage as MESSAGE_DATA_#x [1345]. Device 300 ends the recording process after de-selection of the RECORD function 805 [step 1350]. To record a message for Jim, Sally selects the RECORD function 805, speaks into microphone 365, and de-selects the RECORD function 805 when she has finished.

Device 300 next determines if the PLAY function 810 has been selected [step 1405] (FIG. 14). If Sally wishes to hear the message that she has recorded, she selects the PLAY function 810. If the PLAY function 810 is selected, device 300 plays recorded message MESSAGE_DATA_#x [step 1410]. Once playback of recorded message MESSAGE_DATA_#x completes, or the PLAY function 810 is de-selected [step 1415], device 300 determines if the RECORD function 805 is selected [step 1420]. If so, processing returns to step 1345 (FIG. 13) for re-recording of message MESSAGE_DATA_#x. In the example, if Sally chooses not to re-record the message after hearing her recorded message, she does not select the RECORD function 805. If the RECORD function 805 is not selected, device 300 determines if the SEND function 815 has been selected [step 1425]. If so, device 300 queues MESSAGE_DATA_#x in RAM 330 for subsequent transmission [step 1430]. Sally's message to Jim, therefore, is queued as OUTGOING_MSG_#x in database 400.

The exemplary processing in the flowcharts of FIGS. 13–14 illustrates the recording of audio input by a device user for inclusion in a message. One skilled in the art will appreciate, however, that this processing can be modified to include user input such as video or pictorial data. Such user input can further include handwritten pictures or messages using a digital stylus and "tablet."

EXEMPLARY PROCESSING FOR SENDING A MESSAGE

Figure 15:
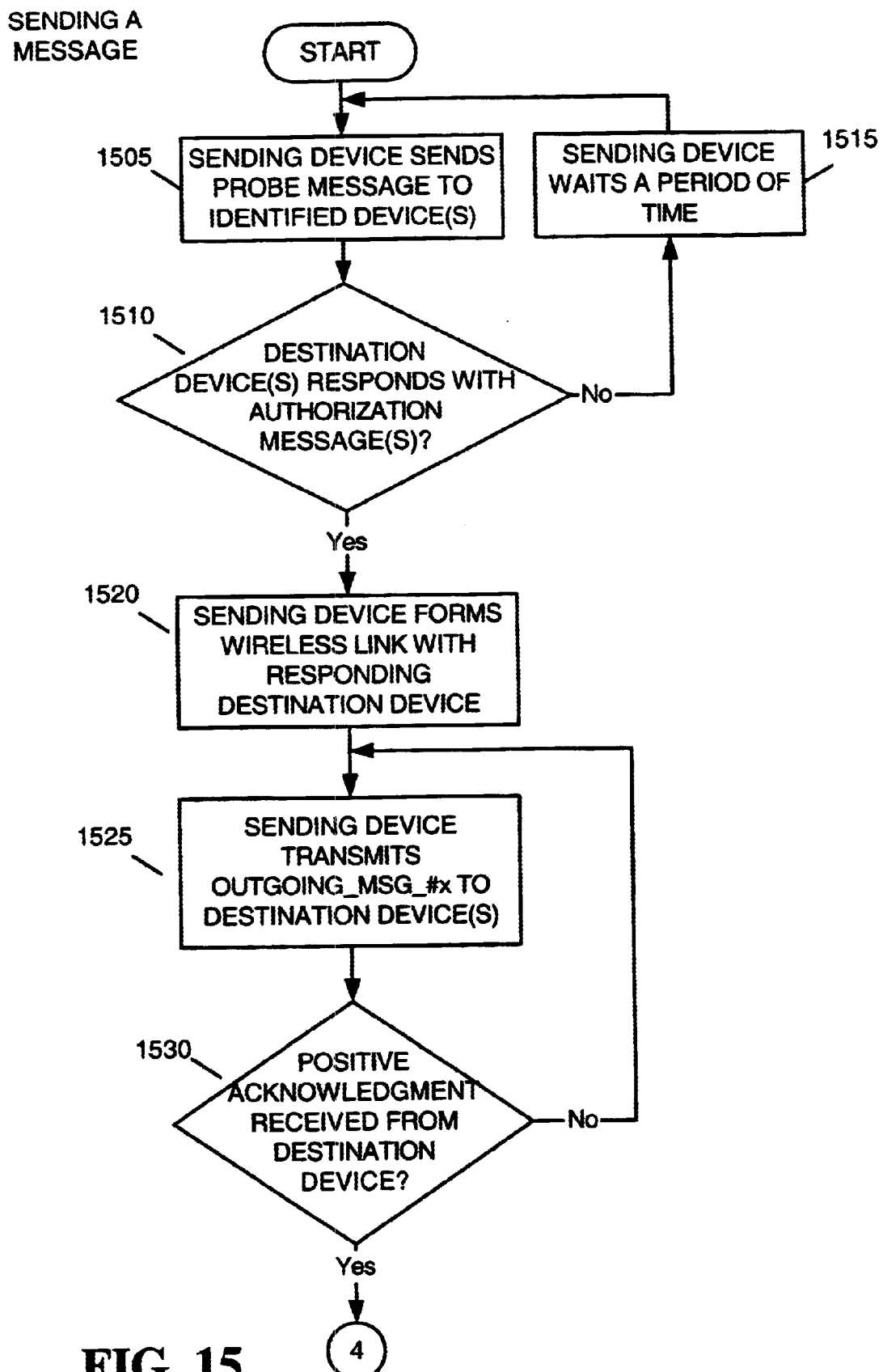
FIGS. 15–16 illustrate exemplary flow diagrams of device processing for sending a message consistent with the present invention.
Figure 16:
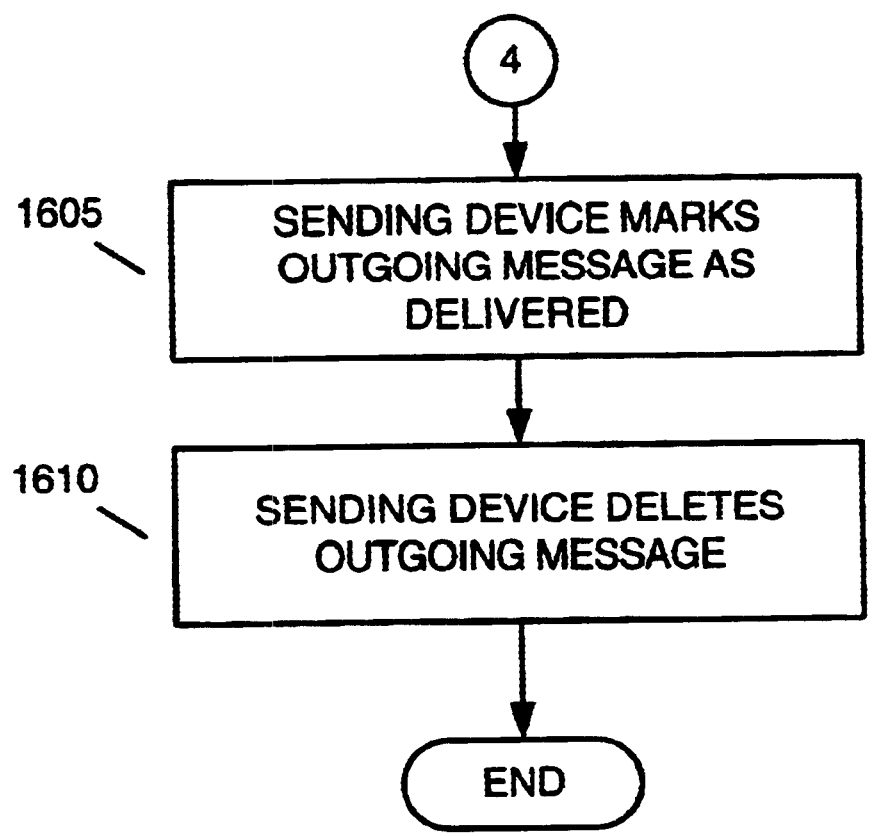

FIGS. 15–16 are flowcharts of system processing, consistent with the present invention, in which device 300 transmits a message queued in RAM 330 to a destination device. As described above, Sally's message to Jim has been queued as OUTGOING_MSG_#x in database 400. To initiate transmission of an outgoing message, the sending device first sends a probe message to the identified device(s) [step 1505] (FIG. 15). The probe message may include a request to send data to the destination device(s). The sending device then determines if the destination device(s) responds with an authorization message(s) [step 1510]. The authorization message authorizes the sending device to send the data to the destination device. If the destination device does not respond with authorization message(s), the sending device waits a configurable period of time before sending another probe message [step 1515]. The configurable period of time may be preset by the manufacturer or set by the device user. If the destination device(s) does respond with an authorization message(s), then the sending device 300 establishes a link-layer wireless connection with the responding device using conventional mechanisms [step 1520].

In the example, Sally's device transmits a probe message to Jim's device, which responds with an authorization message. In response to receipt of the authorization message, Sally's device establishes a link-layer wireless connection with Jim's device.

After establishing the wireless connection, the sending device 300 transmits an outgoing message (OUTGOING_MSG_#x) including MY_UNIQUE_ID 405, MY_ID 410, and message data MESSAGE_DATA_#x [step 1525]. Sally's device would therefore transmit the outgoing message (OUTGOING_MSG_#x) queued in the memory of the device.

After transmission of the message, the sending device awaits receipt of a positive acknowledgment from the destination device, indicating that the destination device successfully received the message [step 1530]. Once received, the sending device marks (field 715 in database 400) the transmitted message as delivered [step 1605] (FIG. 16). The sending device then may optionally delete the transmitted message from database 400 [step 1610]. In the example, Sally's device awaits, after transmitting OUTGOING_MSG_#x, receipt of the positive acknowledgment from Jim's device. When the acknowledgment is received, Sally's device marks the transmitted message as delivered in field 715 of database 400.

EXEMPLARY PROCESSING FOR RECEIVING A MESSAGE

Figure 17:
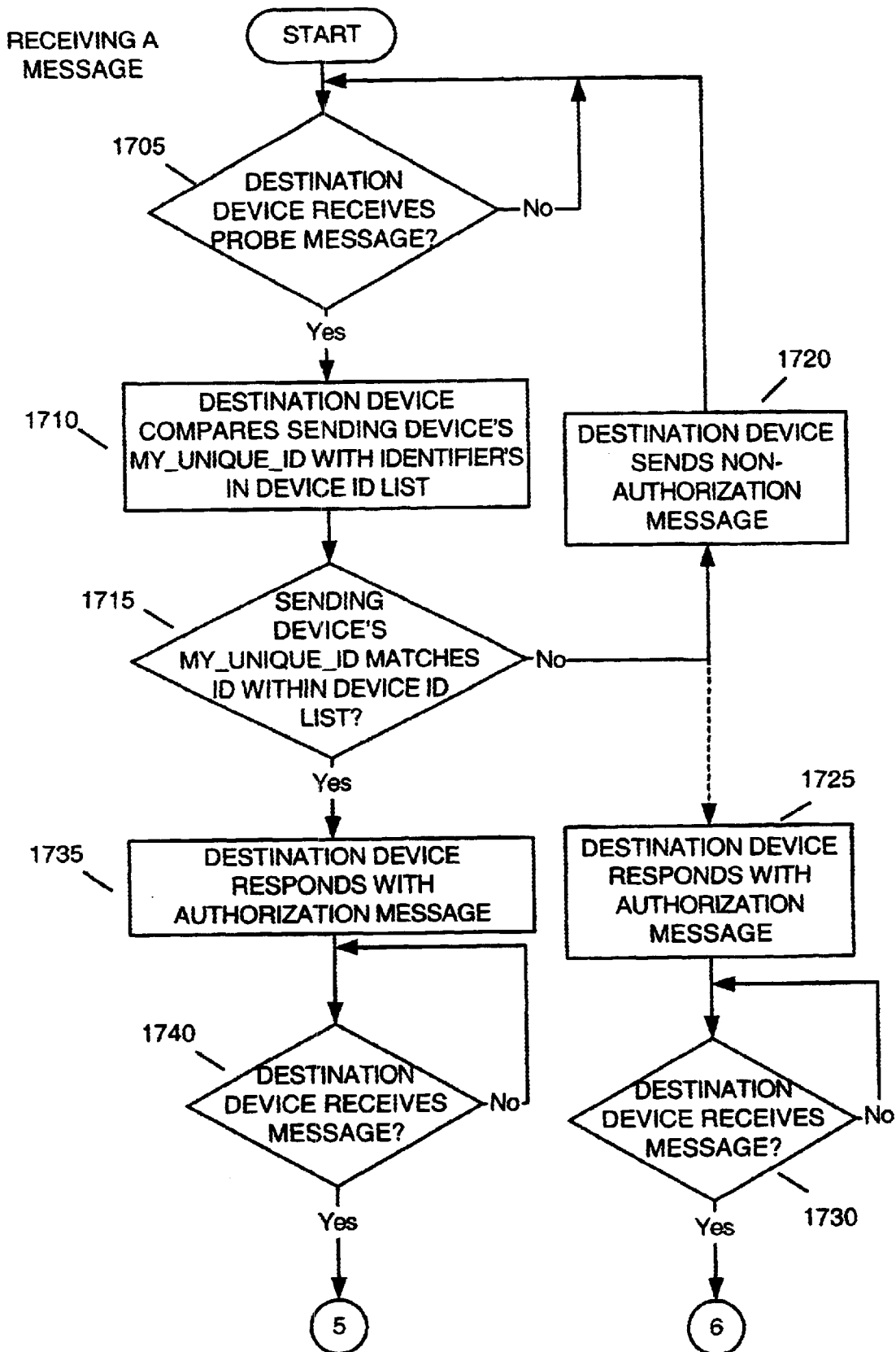
FIGS. 17–19 illustrate exemplary flow diagrams of device processing for receiving a message consistent with the present invention.
Figure 18:
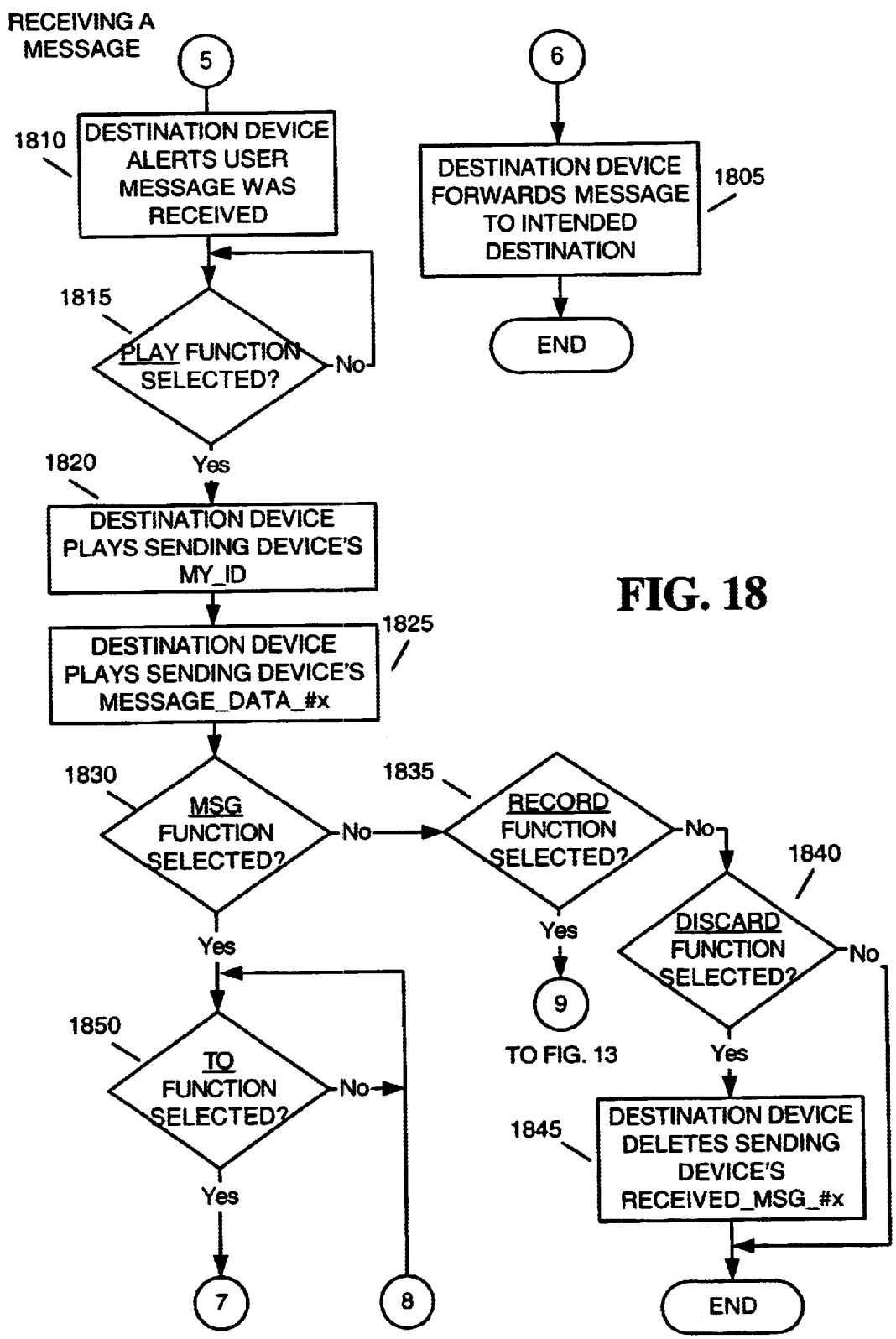
Figure 19:
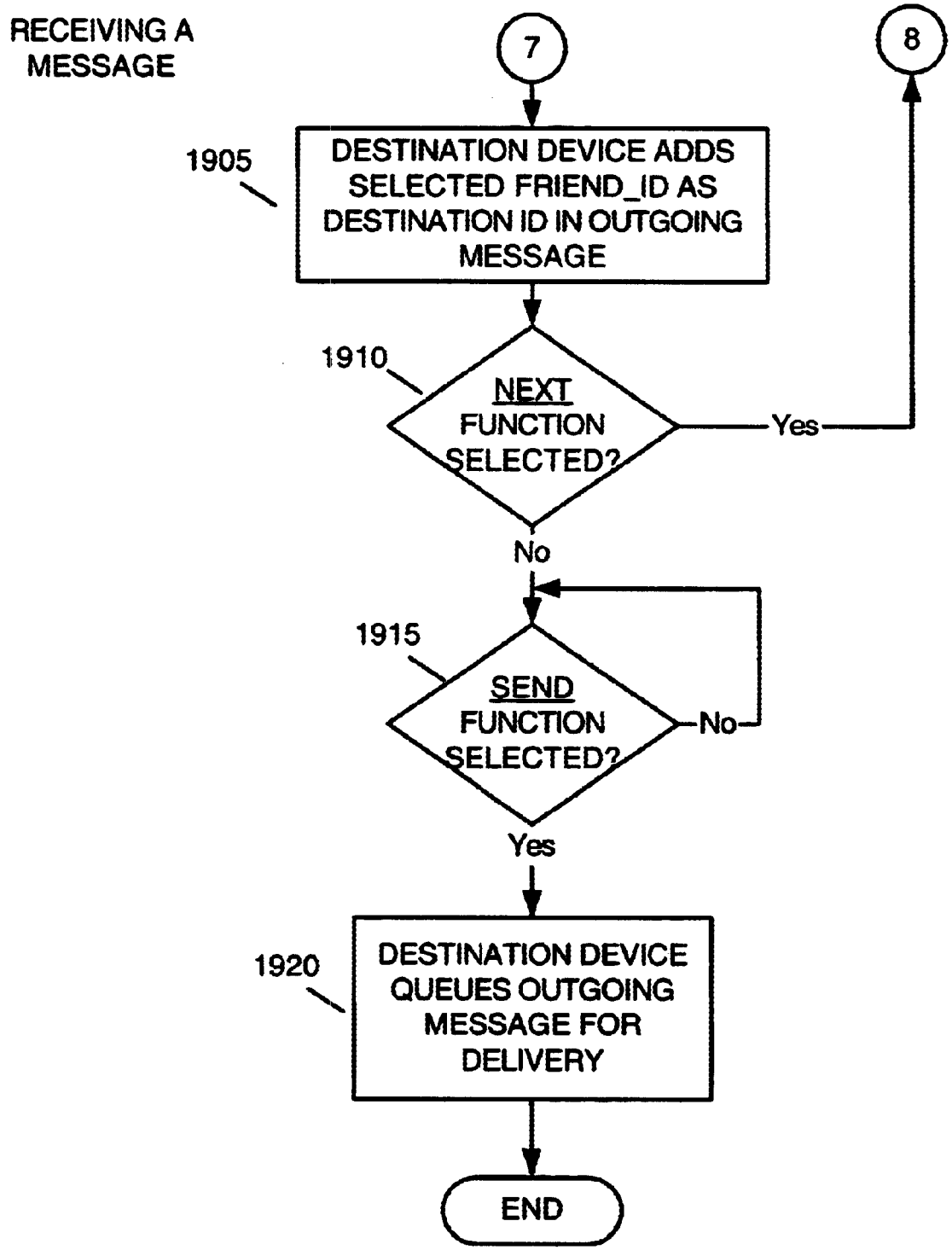

FIGS. 17–19 are flowcharts of system processing, consistent with the present invention, for receiving a message at a destination device. The destination device receives a probe message from the sending device indicating that the sending device wishes to transmit a message to the destination device [step 1705] (FIG. 17). The destination device then compares the MY_UNIQUE_ID contained in the probe message from the sending device with the identifiers contained in the destination device's list 415 [step 1710]. If the sending device's MY_UNIQUE_ID matches an identifier within list 415 [step 1715], then the destination device responds with an authorization message to the sending device [step1735]. If no match is found, the destination device responds with a non-authorization message to the sending device [step 1720]. The non-authorization message indicates that the destination device will not accept a message from the sending device.

In the example, Jim's device receives a probe message from Sally's device. Since Jim and Sally have previously been introduced, the Sally's MY_UNIQUE_ID contained in the probe message matches an identifier previously stored in list 415. Jim's device therefore responds with an authorization message.

Optionally, the destination device may respond with an authorization message even if the sending device's MY_UNIQUE_ID does not match any identifiers in the destination device's list 415 [step 1725]. This may be advantageous in a multi-hop wireless network where point-to-point connectivity between a sending device and a destination device may be impracticable. Therefore, in such a wireless network, each device in the network may route messages, hop by hop, to intended destination devices. To forward messages intended for other wireless devices, the user of the destination may initiate a "forwarding" mode. If the "forwarding" mode has been initiated, the destination device receives a message from the sending device in response to the authorization message [step 1730] and then forwards the received message on to the intended destination device [step 1805] (FIG. 18). In the example, assuming that Jim's device receives a message from a device used by Bob, and the message is intended for Henry, Jim's device may forward the message on to Henry's device.

Returning to step 1715, the destination device determines if the sending device's MY_UNIQUE_ID matches an identifier within list 415. If so, the destination device responds with an authorization message to the sending device [step1735]. In response to the authorization message, the destination device 300 receives a message from the sending device [step 1740]. The destination device alerts the device user that a message was received [step 1810] (FIG. 18). The destination device then determines if the PLAY button 810 has been selected [step 1815]. If so, the destination device plays the MY_ID_#x and MESSAGE_DATA_#x contained in the message received from the sending device (RECEIVED_MSG_#x) [step 1820]. In the example, Jim's device receives the message sent by Sally and then alerts Jim that the message has been received. In response to the alert, Jim selects the PLAY function 810 and listens to Sally's MY_ID audio identifier and Sally's message MESSAGE_DATA_#x.

The destination device user then may have the following options: 1) maintain the message in memory; 2) delete the message; 3) reply to the message; or 4) forward the message on to other devices. The destination device determines if the MSG button 840 has been selected indicating that the user desires to forward the message on to another device(s) [step 1830]. If not, then the destination device determines if the RECORD button 805 has been selected indicating that the user desires to reply to the received message [step 1835]. If the RECORD button 805 has been selected, then the destination device permits the user to reply to the message by performing message recording processing beginning at step 1325 of FIG. 13. However, if the RECORD button 805 has not been selected, then the destination device determines if the DISCARD function 830 has been selected [step 1840] indicating that the user desires to delete the received message. If the DISCARD function 830 has not been selected, the message receiving processing is completed, with the device retaining the received message in memory. If the DISCARD function 830 has been selected, the destination device deletes the sending device's RECEIVED_MSG_#x from memory [step 1845].

If, at step 1830, the destination device determines that the MSG button 840 has been selected, then the destination device permits the user to forward the message to other devices by continuing processing at step 1850. At this step, the destination device determines if the TO function 825 has been selected. If so, the destination device adds the selected FRIEND_ID as a destination identifier in an outgoing message [step 1905] (FIG. 19).

The destination device then determines if the NEXT function 820 has been selected [step 1910] indicating that the device user desires to select another device to receive the forwarded message. If so, the destination device continues processing at step 1850 (FIG. 18). If not, then the destination device determines if the SEND function 815 has been selected [step 1915]. If the SEND function 815 has been selected, the destination device queues the outgoing message for subsequent delivery [step 1920] (see "Message Sending Processing" of Returning to the example, Jim, after listening to the message from Sally, elects to delete the message from memory, instead of replying to the message or forwarding the message, and therefore selects the DISCARD function 830.

EXEMPLARY PROCESSING FOR RE-INITIALIZATION

Figure 20:
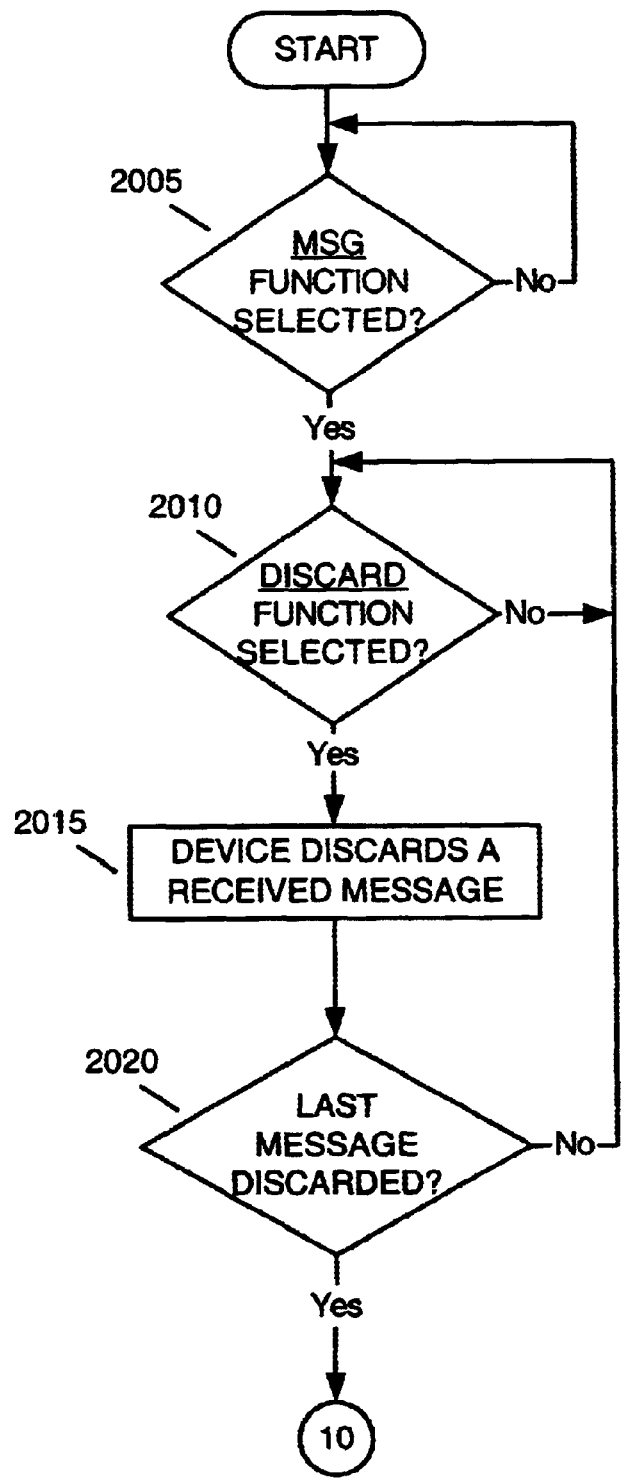
FIGS. 20–21 illustrate exemplary flow diagrams of device processing for reinitialization consistent with the present invention.
Figure 21:
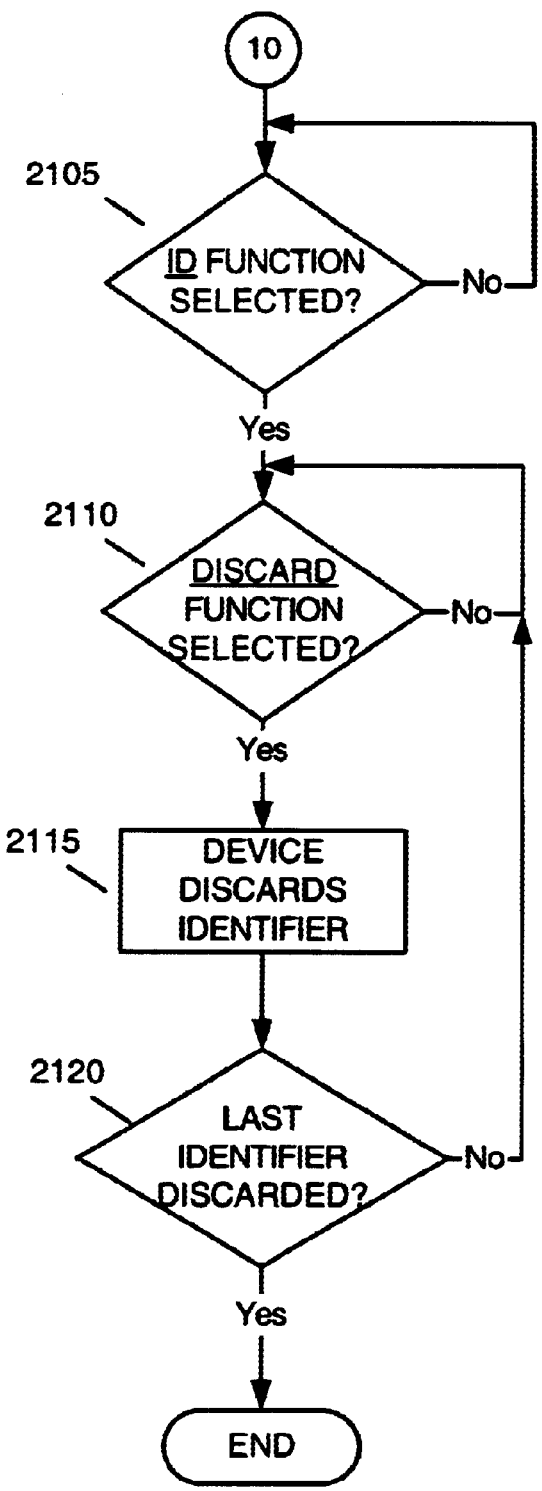

FIGS. 20–21 are flowcharts of system processing, consistent with the present invention, for re-initializing device 300. A user of device 300 may wish to re-initialize device 300 by removing MY_UNIQUE_ID 405 and all received messages (RECEIVED_MSG_#1 605 through RECEIVED_MSG_#N 610) that have been stored in database 400. To re-initialize, device 300 determines if the MSG function 835 has been selected by the device user [step 2005] (FIG. 20). If so, device 300 determines if the DISCARD button 830 has further been selected [step 2010] indicating that the user desires to delete a received message from memory. If the DISCARD button 830 has been selected, device 300 deletes a current received message (RECEIVED_MSG_#x) stored in database 400 [step 2015]. Device 300 then determines if the message just discarded is the last received message [step 2020]. If not, processing returns to step 2010.

In the example, Jim may partially re-initialize his device by first selecting the MSG function 840 and then repeatedly selecting the DISCARD function 830 until all of the received messages have been deleted from memory.

To re-initialize the device identifiers (FRIEND_ID_#1 505–FRIEND_ID_#N 510), device 300 determines if the user has selected the ID function 835 [step 2105] (FIG. 21). If so, device 300 next determines if the DISCARD button 830 has been selected, indicating that the device user desires to delete a device identifier from memory [step 2110]. If so, device 300 deletes a current FRIEND_ID_#x in list 415 [step 2115]. Device 300 concludes re-initialization processing when the most recently deleted identifier is the last identifier in list 415 [step 2120].

In the example, Jim may complete the re-initialization of his device by selecting the ID function 835 and then repeatedly selecting the DISCARD function 830 until all of the device identifiers have been deleted from memory.

CONCLUSION

Systems and methods consistent with the present invention provide mechanisms that improve the delivery of messages in wireless networks by permitting temporary storage of messages in a sending device followed by the transmission or re-transmission of the messages when the destination device(s) comes within the transmission range of the sending device.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while a series of steps have been presented with regard to the processing of FIGS. 10–21, the order of the steps does not matter.

In addition, while communication between wireless devices in the exemplary embodiments above has been disclosed as occurring directly across an air interface, communication between wireless devices may also occur across a cellular infrastructure and through a data network (e.g., the Internet). Such communication would allow messages to be stored on a data server connected to the data network. Storing the messages on a data server would permit wireless device users to archive voice recordings and mail recordings to other wireless devices. This would further advantageously permit wireless devices to exchange messages with other wireless devices anywhere in the world across the data network.

Furthermore, though the exemplary processing described above uses audio data as unique identifiers for each device, one skilled in the art will appreciate that the unique identifiers can include digital video or digital pictorial data. For example, a digital "stylus and tablet" can be associated with transceiver and processing circuitry to permit entry of handwritten pictures (e.g., signatures) for transmission as a MY_UNIQUE_ID device identifier. As another example, a digital camera can be associated with transceiver and processing circuitry to permit the entry of digital pictures (e.g., portraits) for transmission as a MY_UNIQUE_ID device identifier. As an additional example, a digital camcorder can be associated with transceiver and processing circuitry to permit the entry of digital video (e.g., video of the device user) for transmission as a MY_UNIQUE_ID device identifier. The transceiver and processing circuitry may be contained integrally within the digital "stylus and tablet," digital camera, or digital camcorder. The digital "stylus and tablet," camera, and camcorder can also be separate devices interconnected with device 300 so as to permit device 300 to download pictorial or video data.

The exemplary processing described above can be adapted to permit the entry and use of digital video or pictorial data, instead of audio data, for identifying devices. For example, when selecting a destination device for sending a message, a device user could scroll through digital pictures corresponding to other "friend" devices, instead of listening to audio identifiers, to select a message destination. As another example, the exemplary "initialization" processing, described above with respect to FIG. 10, can be adapted to permit the entry and storage of video or pictorial data from MY_UNIQUE_ID instead of recording a verbal phrase. Additionally, audio identifiers MY_UNIQUE_ID_AUDIO and video/pictorial identifiers MY_UNIQUE_ID_PIC can be used together for identifying a device. For example, when selecting a device as a destination for a message, a device user can scroll through digital pictures corresponding to other "friend" devices and hear the audio identifier associated with each visual picture.

The scope of the invention is defined by the following claims and their equivalents.

What is claimed is:

1. A method for introducing a first communication device to a second communication device in a communication network comprising:

transmitting a message from the first communication device, said message comprising presentation data that further comprises at least one of audio, pictorial and video data representing an identity of the first communication device;

receiving said message at the second communication device;

extracting the presentation data from the message;

presenting the presentation data to a user of the second communication device in auditory or visual form;

receiving user input in response to said presentation; and storing said presentation data, as an identifier for the first communication device, in a memory of the second communication device based on said user input.

2. The method of claim 1, further comprising:

deleting said message from said memory based on said user input.

3. A system for introducing a first communication device to a second communication device in a communication network comprising:

means for transmitting a message from the first communication device, said message comprising presentation data that further comprises at least one of audio, pictorial and video data representing an identity of the first communication device;

means for receiving said message at the second communication device;

means for extracting the presentation data from the message;

means for presenting the presentation data to a user of the second communication device in auditory or visual form;

means for receiving user input in response to said presentation; and means for storing said presentation data, as an identifier for the first communication device, in a memory of the second communication device based on said user input.

4. A data structure encoded on a computer readable medium, comprising:

first identifier data indicating a global identification of a first communication device; and second identifier data comprising presentation data, said presentation data further comprising at least one of audio, pictorial and video data representing an identity of the first communication device.

5. The data structure of claim 4, further comprising:

third identifier data indicating a global identification of a second communication device; and fourth identifier data comprising presentation data, said presentation data further comprising at least one of audio, pictorial and video data representing an identity of the second communication device.

6. The data structure of claim 5, further comprising:

message data comprising a message from said first communication device to said second communication device.

7. A method of providing an identifier for a communication device, comprising:

inputting at least one of auditory, pictorial and video information into the communication device;

converting said at least one of auditory, pictorial, and video information into device identifier data; and storing said device identifier data in a memory of said communication device.

8. The method of claim 7, wherein said auditory information is a verbal phrase spoken by a device user.

9. The method of claim 7, wherein said pictorial information comprises a digital representation of a device user's handwriting.

10. The method of claim 7, wherein said pictorial information comprises a digital portrait of a device user.

11. The method of claim 7, wherein said video information comprises video of a device user.

12. A computer-readable medium containing instructions for controlling at least one processor to perform a method of providing an identifier for a communication device, the method comprising:

inputting at least one of auditory, pictorial and video information into the communication device;

converting said at least one of auditory, pictorial and video information into device identifier data; and storing said device identifier data in a memory of said communication device.

13. The computer-readable medium of claim 12, wherein said auditory information is a verbal phrase spoken by a device user.

14. The computer-readable medium of claim 12, wherein said pictorial information comprises a digital representation of a device user's handwriting.

15. The computer-readable medium of claim 12, wherein said pictorial information comprises a digital portrait of a device user.

16. The computer-readable medium of claim 12, wherein said video information comprises video of a device user.

17. A communication device comprising:

a memory;

an input device configured to receive at least one of auditory, pictorial and video information; and a processor configured to:

convert said at least one of auditory, pictorial and video information into device identifier data, and store said device identifier data in the memory.

18. The communication device of claim 17, wherein said auditory information is a verbal phrase spoken by a device user.

19. The communication device of claim 17, wherein said pictorial information comprises a digital representation of a device user's handwriting.

20. The communication device of claim 17, wherein said pictorial information comprises a digital portrait of a device user.

21. The communication device of claim 17, wherein said video information comprises video of a device user.

22. A method of sending a message to one or more recipients in a communications network, comprising:

retrieving device identifiers from a list of device identifiers stored in a memory of a first communication device, said device identifiers comprising at least one of audio, pictorial and video data;

presenting the at least one of audio, pictorial and video data to a user of the first communication device in auditory or visual form;

receiving user input in response to said presentation;

designating a second communication device as a destination for the message based on said user input; and sending the message to the second communication device.

23. The method of claim 22, further comprising:

designating other communication devices as destinations for the message based on said user input.

24. A computer-readable medium containing instructions for controlling at least one processor to perform a method of sending a message to one or more recipients in a communications network, the method comprising:

retrieving device identifiers from a list of device identifiers stored in a memory of a first communication device, said device identifiers comprising at least one of audio, pictorial and video data, presenting the at least one of audio, pictorial and video data to a user of the first communication device in auditory or visual, receiving user input in response to said presentation, designating a second communication device as a destination for the message based on said user input, and sending the message to the second communication device.

25. The computer-readable medium of claim 24, the method further comprising:

designating other communication devices as destinations for the message based on said user input.

26. A first communication device comprising:

a memory configured to store a list of identifiers; and a processor configured to:

retrieve device identifiers from the list of device identifiers stored in the memory, said device identifier comprising at least one of audio, pictorial and video data, present the at least one of audio, pictorial and video data to a user of the first communication device in auditory or visual form, receive user input in response to said presentation, designate a second communication device as a destination for the message based on said user input, and send the message to the second communication device.

27. The first communication device of claim 26, the processor further configured to:

designate other communication devices as destinations for the message based on said user input.

28. A method of authorizing transmission of a message from a first communication device to a second communication device in a communications network, comprising:

receiving a request to send a message from the first communication device, said request containing a device identifier identifying the first communication device; and sending an authorization message to said first communication device authorizing said first communication device to send said message if said device identifier matches any identifiers from a list of identifiers stored in a memory in said second communication device.

29. A computer-readable medium containing instructions for controlling at least one processor to perform a method of authorizing transmission of a message from a first communication device to a second communication device in a communications network, the method comprising:

receiving a request to send a message from the first communication device, said request containing a device identifier identifying the first communication device; and sending an authorization message to said first communication device authorizing said first communication device to send said message if said device identifier matches any identifiers from a list of identifiers stored in a memory of said second communication device.

30. A first communication device, comprising:

a processor configured to:

receive a request to send a message from a second communication device, said request containing a device identifier identifying the second communication device, and send an authorization message to said second communication device authorizing said second communication device to send said message if said device identifier matches any identifiers from a list of identifiers stored in a memory of said first communication device.

31. A method of forwarding a message received at a first communication device in a communications network, comprising:

receiving a message at the first communication device;

retrieving device identifiers from a list of device identifiers stored in a memory of the first communication device, said device identifier comprising at least one of audio, pictorial and video data;

presenting the at least one of audio, pictorial and video data to a user of the first communication device in auditory or visual form;

receiving user input in response to said presentation;

designating a second communication device as a forwarding destination for the message based on said user input; and forwarding the message to the second communication device.

32. The method of claim 31, wherein said auditory information is a verbal phrase spoken by a device user.

33. The method of claim 31, wherein said pictorial information comprises a digital representation of a device user's handwriting.

34. The method of claim 31, wherein said pictorial information comprises a digital portrait of a device user.

35. The method of claim 31, wherein said video information comprises video of a device user.

36. A computer-readable medium containing instructions for controlling at least one processor to perform a method of forwarding a message received at a first communication device in a communications network, the method comprising:

receiving a message at the first communication device;

retrieving device identifiers from a list of device identifiers stored in a memory of the first communication device, said device identifier comprising at least one of audio, pictorial and video data;

presenting the at least one of audio, pictorial data and video to a user of the first communication device in auditory or visual form;

receiving user input in response to said presentation; and designating a second communication device as a forwarding destination for the message based on said user input.

37. The computer-readable medium of claim 36, wherein said auditory information is a verbal phrase spoken by a device user.

38. The computer-readable medium of claim 36, wherein said pictorial information comprises a digital representation of a device user's handwriting.

39. The computer-readable medium of claim 36, wherein said pictorial information comprises a digital portrait of a device user.

40. The computer-readable medium of claim 36, wherein said video information comprises video of a device user.

41. A communication device comprising:

an input device;

a memory configured to store device a list of device identifiers; and a processor configured to:
- receive a message at the first communication device,
- retrieve device identifiers from the list of device identifiers stored in the memory, said device identifiers comprising at least one of audio, pictorial and video data,
- present the audio, pictorial and video data to a user of the first communication device in auditory or visual form,
- receive user input in response to said presentation via the input device, and
- designate a second communication device as a forwarding destination for the message based on said user input.

42. The communication device of claim 41, wherein said auditory information is a verbal phrase spoken by a device user.

43. The communication device of claim 41, wherein said pictorial information comprises a digital representation of a device user's handwriting.

44. The communication device of claim 41, wherein said pictorial information comprises a digital portrait of a device user.

45. The communication device of claim 41, wherein said video information comprises video of a device user.

46. A method of transmitting a message from a first communication device to one or more recipients in a communications network, comprising:

- retrieving device identifiers from a list of device identifiers stored in a memory of the first communication device, said device identifiers comprising at least one of audio, pictorial and video data;
- presenting the at least one of audio, pictorial and video data to a user of the first communication device in auditory or visual form;
- receiving user input in response to said presentation;
- designating a second communication device as a forwarding destination for the message based on said user input;
- queuing said message in the memory of said first communication device;
- transmitting a request to send a message to the second communication device, said request containing a device identifier identifying the first communication device;
- receiving an authorization message from said second communication device authorizing said first communication device to send said message;
- retrieving said queued message from the memory of said first communication device; and
- transmitting said message to said second communication device.

47. The method of claim 46, further comprising:

- designating one or more other communication devices as destinations for the message based on said user input;
- transmitting requests to send said message to the one or more other communication devices, said requests containing a device identifier identifying the first communication device;
- receiving authorization messages from said one or more other communication devices authorizing said first communication device to send said message;
- retrieving said queued message from the memory of said first communication device; and
- transmitting said message to said one or more other communication devices.

48. A communication network, comprising:

at least one first communication device configured to:
- transmit at least one authorization message in response to receiving a request to send a message; and a second communication device configured to:
- retrieve device identifiers from a list of device identifiers stored in a memory, said device identifiers comprising at least one of audio, pictorial and video data,
- present the at least one of audio, pictorial and video data to a user of the second communication device in auditory or visual form,
- receive user input in response to said presentation,
- designate said at least one first communication device as a forwarding destination for the message based on said user input,
- queue said message in the memory,
- transmit said request to send a message to the at least one first communication device, said request containing a device identifier identifying the at least one first communication device,
- receive said at least one authorization message from said at least one first communication device authorizing said second communication device to send said message,
- retrieve said queued message from the memory, and
- transmit said message to said second communication device.

* * * * *

(12) EX PARTE REEXAMINATION CERTIFICATE (9516th)
United States Patent
Elliott

(10) Number: US 6,665,722 C1
(45) Certificate Issued: Feb. 20, 2013

(54) STORE-AND-FORWARD PACKET RADIO SYSTEM AND METHOD

(75) Inventor: Brig Barnum Elliott, Arlington, MA (US)

(73) Assignee: Seesaw Foundation, Longview, TX (US)

Reexamination Request:
No. 90/011,976, Oct. 20, 2011

Reexamination Certificate for:
Patent No.: 6,665,722
Issued: Dec. 16, 2003
Appl. No.: 09/583,352
Filed: May 31, 2000

(51) Int. Cl.
*H04L 12/56* (2006.01)
*H04L 12/28* (2006.01)
*G06F 15/16* (2006.01)

(52) U.S. Cl. ........ 709/227; 370/389; 370/392; 370/432; 370/471; 709/245

(58) Field of Classification Search .................. None
See application file for complete search history.

(56) References Cited

To view the complete listing of prior art documents cited during the proceeding for Reexamination Control Number 90/011,976, please refer to the USPTO's public Patent Application Information Retrieval (PAIR) system under the Display References tab.

*Primary Examiner* — Carolyn B Kosowski

(57) ABSTRACT

A communication device sends a message to one or more recipients in a communications network. The communication device retrieves device identifiers from a list of device identifiers stored in a memory of the device. The device identifiers include audio, pictorial and/or video data. The communication device presents the audio, pictorial and/or video data to a user of the device in auditory or visual form (1310) and then receives user input in response to the presented data (1325). The communication device designates a second communication device as a destination for the message based on the user input (1330). The communication device then sends the message to the second communication device.

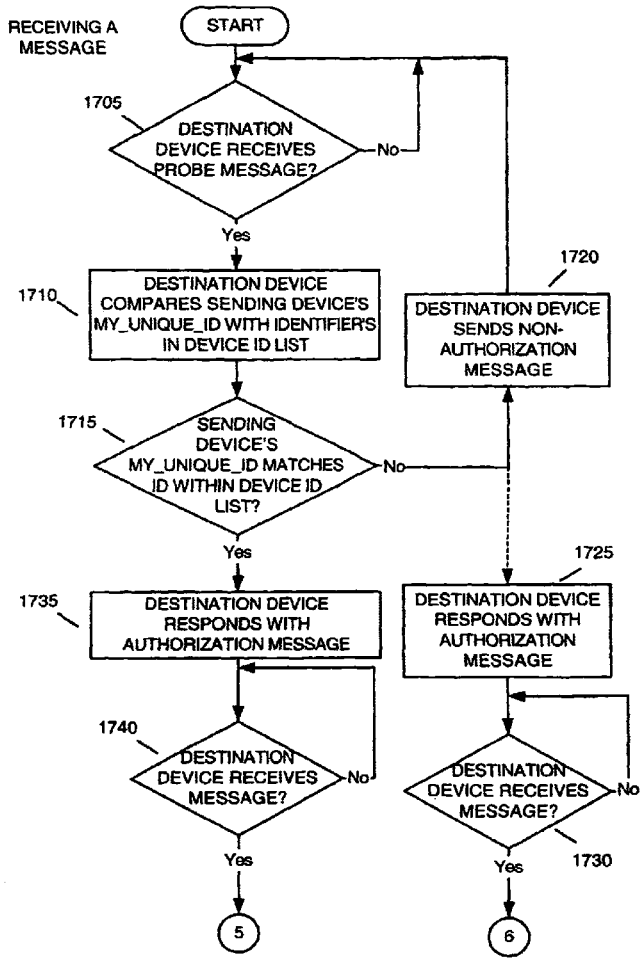

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-3, 7, 8, 10-13, 15, 16, 18, 21, 22-25, 27, 31, 32, 34-37, 39-42, 44-45 are cancelled.

Claims 4-6, 17 and 26 are determined to be patentable as amended.

Claim 20, dependent on an amended claim, is determined to be patentable.

New claims 49-59 are added and determined to be patentable.

Claims 9, 14, 19, 28, 29, 30, 33, 38, 43 and 46-48 were not reexamined.

4. A *non-transitory computer readable medium including a* data structure encoded on [a] *said* computer readable medium, comprising:
   first identifier data indicating a global identification of a first communication device; [and]
   second identifier data comprising presentation data, said presentation data further comprising at least one of audio, pictorial and video data representing an identity of [the] *said* first communication device, *where said at least one of auditory, pictorial and video data includes said pictorial data in a form of first device pictorial data; and*
   *instructions to:*
   *allow communication between said first communication device and a second communication device which are both wireless devices, by directly;*
      *sending a first message from said first communication device to said second communication device, said first message comprising said first device pictorial data and first additional device identifier data associated with said first communication device, and*
      *receiving a second message at said first communication device from said second communication device, said second message comprising second device pictorial data and second additional device identifier data associated with said second communication device,*
   *send first data from said first communication device to said second communication device, by:*
      *after receipt of said second message at said first communication device from said second communication device, displaying said second device pictorial data,*
      *after display of said second device pictorial data, receiving user input,*
      *designating said second communication device as a destination for said first data, based on said user input,*
      *directly sending a first send data request from said first communication device to said second communication device, said first send data request identifying said first communication device,*
      *after sending said first send data request from said first communication device to said second communication device, directly receiving a first authorization message at said first communication device from said second communication device, said first authorization message operable to authorize said first communication device to send said first data, and*
      *after receipt of said first authorization message at said first communication device from said second communication device, directly sending said first data from said first communication device to said second communication device, and*
   *receive second data at said first communication device from a third communication device, by directly:*
      *receiving a second send data request at said first communication device from said third communication device, said second send data request identifying said third communication device,*
      *after receipt of said second send data request at said first communication device from said third communication device, sending a second authorization message from said first communication device to said third communication device, said second authorization message operable to authorize said third communication device to send said second data, and*
      *after sending said second authorization message from said first communication device to said third communication device, receiving said second data at said first communication device from said third communication device.*

5. The *computer readable medium including the* data structure of claim 4, further comprising:
   third identifier data indicating a global identification of a second communication device; and
   fourth identifier data comprising presentation data, said presentation data further comprising at least one of audio, pictorial and video data representing an identity of [the] *said* second communication device.

6. The *computer readable medium including the* data structure of claim 5, further comprising:
   message data comprising a message from said first communication device to said second communication device.

17. A *first* communication device comprising:
   a memory;
   an input device *including a camera* configured to receive at least one of auditory, pictorial and video information, *where said at least one of auditory, pictorial and video information includes said pictorial information*; and
   a processor configured, *under control of instructions,* to:
      convert said at least one of auditory, pictorial and video information into *first pictorial* device identifier data, [and]
      store said *first pictorial* device identifier data in [the] *said* memory, *allow communication between said first communication device and a second communication device which are both wireless devices, by directly:*
         *sending a first message from said first communication device to said second communication device, said first message comprising said first pictorial device identifier data and first additional device identifier data associated with said first communication device, and* receiving a second message at said first communication device from said second communication device, said second message comprising second pictorial device identifier data and second additional device identifier data associated with said second communication device, send first data from said first communication device to said second communication device, by:

after receipt of said second message at said first communication device from said second communication device, displaying said second pictorial device identifier data, after display of said second pictorial device identifier data, receiving user input, designating said second communication device as a destination for said first data, based on said user input, directly sending a first send data request from said first communication device to said second communication device, said first send data request identifying said first communication device, after sending said first send data request from said first communication device to said second communication device, directly receiving a first authorization message at said first communication device from said second communication device, said first authorization message operable to authorize said first communication device to send said first data, and after receipt of said first authorization message at said first communication device from said second communication device, directly sending said first data from said first communication device to said second communication device, and receive second data at said first communication device from said second communication device, by:

after sending said first message from said first communication device to said second communication device, directly receiving a second send data request at said first communication device from said second communication device, said second send data request identifying said second communication device, after receipt of said second send data request at said first communication device from said second communication device, directly sending a second authorization message from said first communication device to said second communication device, said second authorization message operable to authorize said second communication device to send said second data, and after sending said second authorization message from said first communication device to said second communication device, directly receiving said second data at said first communication device from said second communication device.

26. A first communication device comprising:

a memory configured to store a list of *device* identifiers; and a processor configured to:

retrieve device identifiers from the list of device identifiers stored in the memory, said device [identifier] *identifiers* comprising at least one of audio, pictorial and video data, *where said at least one of audio, pictorial and video data said pictorial data,* present the at least one of audio, pictorial and video data to a user of [the] *said* first communication device in auditory or visual form, receive user input in response to said presentation, designate a second communication device as a destination for [the] *a* message based on said user input, [and]

send [the] *said* message to [the] *said* second communication device, allow communication between said first communication device and said second communication device which are both wireless devices, by directly;

sending a first message from said first communication device to said second communication device, said first message comprising first pictorial device identifier data and first additional device identifier data associated with said first communication device, and receiving a second message at said first communication device from said second communication device, said second message comprising second pictorial device identifier data and second additional device identifier data associated with said second communication device, wherein said first communication device is operable such that said message is sent from said first communication device to said second communication device, by:

directly sending a first send data request from said first communication device to said second communication device, said first send data request identifying said first communication device, after sending said first send data request from said first communication device to said second communication device, directly receiving a first authorization message at said first communication device from said second communication device, said first authorization message operable to authorize said first communication device to send first data in association with said message, and after receipt of said first authorization message at said first communication device from said second communication device, directly sending said first data from said first communication device to said second communication device, and receive second data at said first communication device from said second communication device, by directly:

after sending said first message from said first communication device to said second communication device, receiving a second send data request at said first communication device from said second communication device, said second send data request identifying said second communication device, after receipt of said second send data request at said first communication device from said second communication device, sending a second authorization message from said first communication device to said second communication device, said second authorization message operable to authorize said second communication device to send said second data, and after sending said second authorization message from said first communication device to said second communication device, receiving said second data at said first communication device from said second communication device.

49. *The first communication device of claim 17, wherein said first communication device is operable such that said first authorization message is operable to authorize said first* communication device to send only said first data, such that at least one authorization message is required for communication of each different data requested to be sent.

50. The first communication device of claim 17, wherein said first communication device is operable such that a delivery indicator is provided that identifies when said first data is sent from said first communication device to said second communication device.

51. The first communication device of claim 17, wherein:
said processor is configured to allow communication between said first communication device and said second communication device by way of an introduction,
said first communication device is operable such that said first data is initially queued and sent thereafter, and
after receipt of said first authorization message at said first communication device from said second communication device, a link layer wireless connection is established for sending said first data from said first communication device to said second communication device.

52. The first communication device of claim 17, wherein said processor is configured to wait a period of time for said first authorization message, after sending said first send data request.

53. The first communication device of claim 52, wherein said period of time is set by a device user.

54. The first communication device of claim 52, wherein said period of time is set by a device manufacturer.

55. The first communication device of claim 17, wherein said processor is configured such that said second authorization message is conditionally sent from said first communication device to said second communication device based on whether a device identifier associated with said second send data request matches any identifiers from a list of identifiers stored in said memory in said first communication device.

56. The first communication device of claim 17, wherein said processor is configured such that said first send data request is sent after said designating.

57. The first communication device of claim 17, wherein:
said first communication device includes a touch sensitive display screen for receiving said user input,
said first communication device is operable such that said first message is sent in response to a user selection of an introduction function,
said memory includes at least one of random access memory or read only memory, and
said first data and second data are sent directly across an air interface,
where an exchange of said first message and said second message are capable of occurring simultaneously.

58. The first communication device of claim 17, wherein:
said first data is part of a message,
said first data is forwarded, and
said first additional device identifier data includes a globally unique identifier.

59. A non-transitory computer-readable medium containing instructions for controlling at least one processor to perform a method of authorizing transmission of a message from a first communication device to a second communication device directly across an air interface in a communications network, the method comprising:
receiving a request to send a message from the first communication device directly across the air interface, said request containing a device identifier identifying the first communication device; and
sending an authorization message to said first communication device directly across the air interface authorizing said first communication device to send said message if said device identifier matches any identifiers from a list of identifiers stored in a non-volatile memory of said second communication device;
wherein said instructions are operable such that said device identifier is stored in association with said list of identifiers, in said non-volatile memory of said second communication device, in response to operations resulting from execution of:
code for, before establishing a wireless connection capable of allowing data messages to be communicated from said first communication device to said second communication device directly across the air interface, receiving information associated with said first communication device with a purpose of allowing said data messages to be communicated from said first communication device to said second communication device,
code for, in response to receiving said information associated with said first communication device, presenting said information associated with said first communication device,
code for, after presenting said information associated with said first communication device, allowing receipt of user input, and code for storing said device identifier in association with said list of identifiers, in said non-volatile memory of said second communication device, based on said user input,
wherein said instructions are further operable such that said request to send said message is received, after storing said device identifier in association with said list of identifiers, in said non-volatile memory of said second communication device,
wherein said instructions are further operable such that said list of identifiers stored in said non-volatile memory of said second communication device is capable of being modified by adding different device identifiers,
wherein said instructions are further operable such that said information is received in connection with at least one step of an introduction involving said first communication device and said second communication device.

* * * * *